United States Patent
Carlucci et al.

(10) Patent No.: US 11,509,866 B2
(45) Date of Patent: Nov. 22, 2022

(54) METHOD AND APPARATUS FOR MULTI-BAND DISTRIBUTION OF DIGITAL CONTENT

(71) Applicant: TIME WARNER CABLE ENTERPRISES LLC, New York, NY (US)

(72) Inventors: John Carlucci, Boulder, CO (US); William Helms, Longmont, CO (US); Louis Williamson, Denver, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 524 days.

(21) Appl. No.: 15/665,271

(22) Filed: Jul. 31, 2017

(65) Prior Publication Data

US 2018/0020190 A1    Jan. 18, 2018

Related U.S. Application Data

(62) Division of application No. 11/013,671, filed on Dec. 15, 2004, now Pat. No. 9,723,267.

(51) Int. Cl.
*H04N 7/173* (2011.01)
*H04N 21/2365* (2011.01)
(Continued)

(52) U.S. Cl.
CPC ... *H04N 7/17318* (2013.01); *H04N 21/23655* (2013.01); *H04N 21/42615* (2013.01);
(Continued)

(58) Field of Classification Search
CPC ....... H04N 21/23655; H04N 21/42615; H04N 21/47208; H04N 21/6118; H04N 21/6371; H04N 21/6377; H04N 21/658
(Continued)

(56) References Cited

U.S. PATENT DOCUMENTS

| 4,750,213 A | 6/1988 | Novak |
| 4,760,442 A | 7/1988 | O'Connell et al. |

(Continued)

FOREIGN PATENT DOCUMENTS

| CA | 2590138 A1 | 6/2006 |
| CA | 2806443 C | 11/2017 |

(Continued)

OTHER PUBLICATIONS

Aggrawal et al., "The Effectiveness of Intelligent Scheduling for Multicast Video-on-Demand", ACM, 2009.
(Continued)

*Primary Examiner* — Joshua D Taylor
(74) *Attorney, Agent, or Firm* — Patent Beach PC

(57) ABSTRACT

A method and apparatus to create and transmit transport multiplexes comprising one or more levels of service over a network. In one embodiment, the level of service comprises high definition (HD) content or programs, and the transmitted multiplexes are distributed over a plurality of downstream RF carriers in a cable network simultaneously. A head-end architecture for performing the multiplexing and distribution of multiple HD programs over the multiple carriers (i.e., in a "wideband" configuration) is disclosed. CPE having one or more wideband tuners is also disclosed, the CPE being adapted to receive the multiplexed HD content from the various RF carriers, and demultiplex it in order to permit decoding and subsequent viewing by the user. The use of multiple HD source programs with the multiplex advantageously provides for enhanced statistical multiplexing by providing a larger "pool" of constituent inputs and available carriers.

21 Claims, 10 Drawing Sheets

(51) Int. Cl.
  *H04N 21/426* (2011.01)
  *H04N 21/472* (2011.01)
  *H04N 21/61* (2011.01)
  *H04N 21/6371* (2011.01)
  *H04N 21/6377* (2011.01)
  *H04N 21/658* (2011.01)

(52) U.S. Cl.
  CPC ... *H04N 21/47208* (2013.01); *H04N 21/6118* (2013.01); *H04N 21/6371* (2013.01); *H04N 21/6377* (2013.01); *H04N 21/658* (2013.01)

(58) Field of Classification Search
  USPC ........ 725/116, 118, 146, 148; 370/343, 412, 370/537
  See application file for complete search history.

(56) References Cited

U.S. PATENT DOCUMENTS

| | | | |
|---|---|---|---|
| 5,528,284 A | 6/1996 | Iwami et al. | |
| 5,594,491 A | 1/1997 | Hodge et al. | |
| 5,606,359 A | 2/1997 | Youden et al. | |
| 5,613,191 A | 3/1997 | Hylton et al. | |
| 5,642,151 A | 6/1997 | Nusbickel et al. | |
| 5,708,664 A | 1/1998 | Budge et al. | |
| 5,708,961 A | 1/1998 | Hylton et al. | |
| 5,745,837 A | 4/1998 | Fuhrmann | |
| 5,818,438 A | 10/1998 | Howe et al. | |
| 5,822,530 A | 10/1998 | Brown | |
| 5,826,166 A | 10/1998 | Brooks et al. | |
| 5,838,921 A | 11/1998 | Speeter | |
| 5,872,588 A | 2/1999 | Aras et al. | |
| 5,897,635 A | 4/1999 | Torres et al. | |
| 5,940,738 A | 8/1999 | Rao | |
| 5,983,318 A | 11/1999 | Willson et al. | |
| 6,052,365 A * | 4/2000 | Bhagalia | G06F 9/546 370/336 |
| 6,072,982 A | 6/2000 | Haddad | |
| 6,118,976 A | 9/2000 | Arias et al. | |
| 6,125,397 A | 9/2000 | Yoshimura et al. | |
| 6,163,530 A | 12/2000 | Kim | |
| 6,167,432 A | 12/2000 | Jiang | |
| 6,181,697 B1 | 1/2001 | Nurenberg et al. | |
| 6,198,478 B1 | 3/2001 | Ota et al. | |
| 6,219,358 B1 | 4/2001 | Pinder et al. | |
| 6,219,710 B1 | 4/2001 | Gray et al. | |
| 6,259,701 B1 | 7/2001 | Shur et al. | |
| 6,330,609 B1 | 12/2001 | Garofalakis et al. | |
| 6,345,038 B1 | 2/2002 | Selinger | |
| 6,389,538 B1 | 5/2002 | Gruse et al. | |
| 6,473,793 B1 | 10/2002 | Dillon et al. | |
| 6,510,556 B1 | 1/2003 | Kusaba et al. | |
| 6,519,062 B1 | 2/2003 | Yoo | |
| 6,523,696 B1 | 2/2003 | Saito et al. | |
| 6,543,053 B1 | 4/2003 | Li et al. | |
| 6,564,381 B1 | 5/2003 | Hodge et al. | |
| 6,583,825 B1 | 6/2003 | Yuen et al. | |
| 6,591,422 B1 | 7/2003 | Cesar et al. | |
| 6,640,145 B2 | 10/2003 | Hoffberg et al. | |
| 6,643,262 B1 | 11/2003 | Larsson et al. | |
| 6,651,141 B2 | 11/2003 | Adrangi | |
| 6,675,388 B1 | 1/2004 | Beckmann et al. | |
| 6,694,145 B2 | 2/2004 | Riikonen et al. | |
| 6,718,552 B1 | 4/2004 | Goode | |
| 6,754,271 B1 | 6/2004 | Gordon et al. | |
| 6,788,676 B2 | 9/2004 | Partanen et al. | |
| 6,886,029 B1 | 4/2005 | Pecus et al. | |
| 6,889,382 B1 | 5/2005 | Anderson | |
| 6,909,726 B1 | 6/2005 | Sheeran | |
| 6,910,078 B1 | 6/2005 | Raman et al. | |
| 6,925,257 B2 | 8/2005 | Yoo | |
| 6,944,150 B1 | 9/2005 | Mcconnell et al. | |
| 6,993,353 B2 | 1/2006 | Desai et al. | |
| 7,003,790 B1 | 2/2006 | Inoue et al. | |
| 7,006,881 B1 | 2/2006 | Hoffberg et al. | |
| 7,009,972 B2 | 3/2006 | Maher et al. | |
| 7,020,893 B2 | 3/2006 | Connelly | |
| 7,027,460 B2 | 4/2006 | Iyer et al. | |
| 7,039,048 B1 | 5/2006 | Monta et al. | |
| 7,054,902 B2 | 5/2006 | Toporek et al. | |
| 7,068,639 B1 | 6/2006 | Varma et al. | |
| 7,069,577 B2 | 6/2006 | Geile et al. | |
| 7,099,308 B2 | 8/2006 | Merrill et al. | |
| 7,106,382 B2 | 9/2006 | Shiotsu | |
| 7,149,772 B1 | 12/2006 | Kalavade | |
| 7,174,126 B2 | 2/2007 | Mcelhatten et al. | |
| 7,174,127 B2 | 2/2007 | Otten et al. | |
| 7,174,384 B2 | 2/2007 | Cheung et al. | |
| 7,174,385 B2 | 2/2007 | Li | |
| 7,207,055 B1 | 4/2007 | Hendricks et al. | |
| 7,209,458 B2 | 4/2007 | Ahvonen et al. | |
| 7,213,036 B2 | 5/2007 | Apparao et al. | |
| 7,228,154 B2 | 6/2007 | Champion et al. | |
| 7,228,555 B2 | 6/2007 | Schlack | |
| 7,242,960 B2 | 7/2007 | Van et al. | |
| 7,254,608 B2 | 8/2007 | Yeager et al. | |
| 7,266,133 B2 | 9/2007 | Wu et al. | |
| 7,272,227 B1 | 9/2007 | Beran | |
| 7,325,073 B2 | 1/2008 | Shao et al. | |
| 7,330,483 B1 | 2/2008 | Peters, Jr. et al. | |
| 7,336,787 B2 | 2/2008 | Unger et al. | |
| 7,359,375 B2 | 4/2008 | Lipsanen et al. | |
| 7,363,643 B2 | 4/2008 | Drake et al. | |
| 7,373,650 B1 * | 5/2008 | Rodriguez | H04N 5/44591 348/565 |
| 7,376,386 B2 | 5/2008 | Phillips et al. | |
| 7,383,564 B2 | 6/2008 | White et al. | |
| 7,389,523 B2 | 6/2008 | Kikinis | |
| 7,457,520 B2 | 11/2008 | Rosetti et al. | |
| 7,486,869 B2 | 2/2009 | Alexander et al. | |
| 7,499,462 B2 | 3/2009 | Macmullan et al. | |
| 7,567,983 B2 | 7/2009 | Pickelsimer et al. | |
| 7,592,912 B2 | 9/2009 | Hasek et al. | |
| 7,602,820 B2 | 10/2009 | Helms et al. | |
| 7,609,637 B2 | 10/2009 | Doshi et al. | |
| 7,690,020 B2 | 3/2010 | Lebar | |
| 7,693,171 B2 | 4/2010 | Gould | |
| 7,721,314 B2 | 5/2010 | Sincaglia et al. | |
| 7,742,074 B2 | 6/2010 | Minatogawa | |
| 7,770,200 B2 | 8/2010 | Brooks et al. | |
| 7,809,942 B2 | 10/2010 | Baran et al. | |
| 7,827,227 B2 | 11/2010 | Iijima et al. | |
| 7,889,765 B2 | 2/2011 | Brooks et al. | |
| 7,900,052 B2 | 3/2011 | Jonas et al. | |
| 7,916,755 B2 | 3/2011 | Hasek et al. | |
| 7,930,716 B2 | 4/2011 | Liga et al. | |
| 7,936,775 B2 | 5/2011 | Iwamura | |
| 7,954,131 B2 | 5/2011 | Cholas et al. | |
| 7,971,222 B2 | 6/2011 | Ellis | |
| 7,983,272 B2 | 7/2011 | Carlson et al. | |
| 8,045,628 B2 | 10/2011 | Lahtonen et al. | |
| 8,281,352 B2 | 10/2012 | Brooks et al. | |
| 8,341,242 B2 | 12/2012 | Dillon et al. | |
| 8,516,529 B2 | 8/2013 | Lajoie et al. | |
| 8,910,221 B2 | 12/2014 | Caputo | |
| 9,185,341 B2 | 11/2015 | Hardin | |
| 9,215,423 B2 | 12/2015 | Kimble et al. | |
| 9,300,445 B2 | 3/2016 | Hardin et al. | |
| 9,723,267 B2 | 8/2017 | Carlucci et al. | |
| 9,736,512 B2 | 8/2017 | Caputo et al. | |
| 9,900,642 B2 | 2/2018 | Hardin et al. | |
| 9,942,077 B2 | 4/2018 | Hardin | |
| 10,200,731 B2 | 2/2019 | Hardin et al. | |
| 10,411,939 B2 | 9/2019 | Hardin | |
| 10,432,990 B2 | 10/2019 | Caputo | |
| RE47,760 E | 12/2019 | Hardin | |
| 2001/0004768 A1 | 6/2001 | Hodge et al. | |
| 2001/0013097 A1 | 8/2001 | Ito | |
| 2001/0050945 A1 | 12/2001 | Lindsey | |
| 2001/0055305 A1 | 12/2001 | Oz et al. | |
| 2001/0055336 A1 | 12/2001 | Krause et al. | |
| 2002/0001350 A1 | 1/2002 | Wu et al. | |
| 2002/0002708 A1 | 1/2002 | Arye | |

(56) References Cited

U.S. PATENT DOCUMENTS

| | | |
|---|---|---|
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0037727 A1 | 3/2002 | Mckenna et al. |
| 2002/0056098 A1 | 5/2002 | White |
| 2002/0056119 A1 | 5/2002 | Moynihan |
| 2002/0056125 A1 | 5/2002 | Hodge et al. |
| 2002/0059218 A1 | 5/2002 | August et al. |
| 2002/0059619 A1 | 5/2002 | Lebar |
| 2002/0059626 A1 | 5/2002 | Lemmons |
| 2002/0059638 A1 | 5/2002 | Oz et al. |
| 2002/0066033 A1 | 5/2002 | Dobbins et al. |
| 2002/0069420 A1 | 6/2002 | Russell et al. |
| 2002/0085584 A1 | 7/2002 | Itawaki et al. |
| 2002/0087967 A1 | 7/2002 | Conkwright et al. |
| 2002/0087995 A1 | 7/2002 | Pedlow et al. |
| 2002/0092026 A1 | 7/2002 | Janniello et al. |
| 2002/0129374 A1 | 9/2002 | Freeman et al. |
| 2002/0133618 A1 | 9/2002 | Desai et al. |
| 2002/0138831 A1 | 9/2002 | Wachtfogel et al. |
| 2002/0138854 A1* | 9/2002 | Desai ............... H04L 12/2801 725/147 |
| 2002/0146023 A1* | 10/2002 | Myers ............... H04N 21/24 370/412 |
| 2002/0147771 A1 | 10/2002 | Traversat et al. |
| 2002/0152299 A1 | 10/2002 | Traversat et al. |
| 2002/0166121 A1 | 11/2002 | Rovira |
| 2002/0188744 A1 | 12/2002 | Mani |
| 2002/0188869 A1 | 12/2002 | Patrick |
| 2002/0194372 A1* | 12/2002 | Elmaliach ............... H04L 47/527 709/240 |
| 2003/0002577 A1* | 1/2003 | Pinder ............... H04B 1/66 375/240.01 |
| 2003/0028889 A1 | 2/2003 | Mccoskey et al. |
| 2003/0037331 A1 | 2/2003 | Lee |
| 2003/0056217 A1 | 3/2003 | Brooks |
| 2003/0083054 A1* | 5/2003 | Francesca ............... H04L 5/0005 455/418 |
| 2003/0097476 A1 | 5/2003 | Saxena et al. |
| 2003/0112372 A1 | 6/2003 | Weaver et al. |
| 2003/0115267 A1 | 6/2003 | Hinton et al. |
| 2003/0121047 A1 | 6/2003 | Watson et al. |
| 2003/0147655 A1 | 8/2003 | Shattil et al. |
| 2003/0156218 A1 | 8/2003 | Laksono |
| 2003/0163817 A1 | 8/2003 | Han |
| 2003/0165241 A1 | 9/2003 | Fransdonk |
| 2003/0166401 A1 | 9/2003 | Combes et al. |
| 2003/0208612 A1 | 11/2003 | Harris et al. |
| 2003/0208767 A1 | 11/2003 | Williamson et al. |
| 2003/0217137 A1 | 11/2003 | Roese et al. |
| 2003/0217362 A1 | 11/2003 | Summers et al. |
| 2003/0217365 A1 | 11/2003 | Caputo |
| 2003/0220072 A1 | 11/2003 | Coffin, III |
| 2004/0015551 A1 | 1/2004 | Thornton |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0060074 A1 | 3/2004 | Basawapatna et al. |
| 2004/0068751 A1 | 4/2004 | Basawapatna et al. |
| 2004/0090283 A1 | 5/2004 | Naito |
| 2004/0090996 A1 | 5/2004 | Wu et al. |
| 2004/0123324 A1 | 6/2004 | Sazzad et al. |
| 2004/0133923 A1 | 7/2004 | Watson et al. |
| 2004/0137918 A1 | 7/2004 | Varonen et al. |
| 2004/0163129 A1* | 8/2004 | Chapman ............... H04H 60/97 725/126 |
| 2004/0177161 A1* | 9/2004 | Hoang ............... H04L 12/1836 709/246 |
| 2004/0181666 A1* | 9/2004 | Candelore ............... H04N 21/4623 713/160 |
| 2004/0181800 A1 | 9/2004 | Rakib et al. |
| 2004/0221166 A1* | 11/2004 | Steenstra ............... G06Q 20/341 713/182 |
| 2004/0228269 A1* | 11/2004 | Balakrishnan ............... H04L 5/023 370/208 |
| 2004/0230994 A1 | 11/2004 | Urdang et al. |
| 2004/0250273 A1 | 12/2004 | Swix et al. |
| 2005/0021539 A1 | 1/2005 | Short |
| 2005/0025039 A1 | 2/2005 | Hwang et al. |
| 2005/0034171 A1 | 2/2005 | Benya |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0071882 A1 | 3/2005 | Rodriguez et al. |
| 2005/0086334 A1 | 4/2005 | Aaltonen et al. |
| 2005/0086683 A1 | 4/2005 | Meyerson |
| 2005/0105528 A1* | 5/2005 | Kobayashi ............... G11B 27/034 370/390 |
| 2005/0108763 A1 | 5/2005 | Baran et al. |
| 2005/0114900 A1 | 5/2005 | Ladd et al. |
| 2005/0114903 A1 | 5/2005 | Ahmed et al. |
| 2005/0129042 A1 | 6/2005 | Muhonen et al. |
| 2005/0177855 A1 | 8/2005 | Maynard et al. |
| 2005/0188415 A1 | 8/2005 | Riley |
| 2005/0190794 A1 | 9/2005 | Krause et al. |
| 2005/0195910 A1 | 9/2005 | Kim et al. |
| 2005/0198686 A1 | 9/2005 | Krause et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0047957 A1 | 3/2006 | Helms et al. |
| 2006/0078063 A1* | 4/2006 | Hottinen ............... H04L 27/265 375/267 |
| 2006/0085727 A1 | 4/2006 | Azenkot et al. |
| 2006/0093067 A1* | 5/2006 | Jalali ............... H04L 5/023 375/299 |
| 2006/0095940 A1 | 5/2006 | Yearwood |
| 2006/0127039 A1 | 6/2006 | Van |
| 2006/0130099 A1 | 6/2006 | Rooyen |
| 2006/0130101 A1 | 6/2006 | Wessel et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0149850 A1 | 7/2006 | Bowman |
| 2006/0150216 A1 | 7/2006 | Herz et al. |
| 2006/0159093 A1 | 7/2006 | Joo et al. |
| 2006/0161635 A1 | 7/2006 | Lamkin et al. |
| 2006/0187900 A1 | 8/2006 | Akbar |
| 2006/0206712 A1 | 9/2006 | Dillaway et al. |
| 2006/0209745 A1 | 9/2006 | MacMullan |
| 2006/0209799 A1 | 9/2006 | Gallagher et al. |
| 2006/0209890 A1 | 9/2006 | Macmullan et al. |
| 2006/0218604 A1 | 9/2006 | Riedl et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019603 A1 | 1/2007 | Gerhardt et al. |
| 2007/0019645 A1 | 1/2007 | Menon |
| 2007/0022444 A1 | 1/2007 | Santhoff |
| 2007/0022459 A1 | 1/2007 | Gaebel et al. |
| 2007/0022469 A1 | 1/2007 | Cooper et al. |
| 2007/0030918 A1 | 2/2007 | Kobayashi et al. |
| 2007/0033531 A1 | 2/2007 | Marsh |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0083902 A1 | 4/2007 | Urdang et al. |
| 2007/0094691 A1 | 4/2007 | Gazdzinski |
| 2007/0121678 A1 | 5/2007 | Brooks et al. |
| 2007/0124488 A1 | 5/2007 | Baum et al. |
| 2007/0180230 A1 | 8/2007 | Cortez |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0250880 A1 | 10/2007 | Hainline |
| 2007/0261116 A1 | 11/2007 | Prafullchandra et al. |
| 2007/0263743 A1 | 11/2007 | Lee et al. |
| 2007/0276926 A1 | 11/2007 | Lajoie et al. |
| 2007/0294717 A1 | 12/2007 | Hill et al. |
| 2008/0022012 A1 | 1/2008 | Wang |
| 2008/0059804 A1 | 3/2008 | Shah et al. |
| 2008/0066112 A1 | 3/2008 | Bailey et al. |

(56) References Cited

U.S. PATENT DOCUMENTS

| | | |
|---|---|---|
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0133551 A1 | 6/2008 | Wensley et al. |
| 2008/0137541 A1 | 6/2008 | Agarwal et al. |
| 2008/0155059 A1 | 6/2008 | Hardin et al. |
| 2008/0162353 A1 | 7/2008 | Tom et al. |
| 2008/0192820 A1 | 8/2008 | Brooks et al. |
| 2008/0216115 A1 | 9/2008 | Kikinis |
| 2008/0222684 A1 | 9/2008 | Mukraj et al. |
| 2008/0235746 A1 | 9/2008 | Peters et al. |
| 2008/0273591 A1 | 11/2008 | Brooks et al. |
| 2008/0282299 A1 | 11/2008 | Koat et al. |
| 2008/0320540 A1 | 12/2008 | Brooks et al. |
| 2009/0031384 A1 | 1/2009 | Brooks et al. |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0103651 A1 | 4/2009 | Lahtonen et al. |
| 2009/0116374 A1 | 5/2009 | Henriksson et al. |
| 2009/0133079 A1 | 5/2009 | Li et al. |
| 2009/0141696 A1 | 6/2009 | Chou et al. |
| 2009/0150917 A1 | 6/2009 | Huffman et al. |
| 2009/0163218 A1 | 6/2009 | Liu et al. |
| 2009/0172776 A1 | 7/2009 | Makagon et al. |
| 2009/0185576 A1 | 7/2009 | Kisel et al. |
| 2009/0187934 A1 | 7/2009 | Norman |
| 2009/0190677 A1 | 7/2009 | Jokela et al. |
| 2009/0193485 A1 | 7/2009 | Rieger et al. |
| 2009/0201917 A1 | 8/2009 | Maes et al. |
| 2009/0210912 A1 | 8/2009 | Cholas et al. |
| 2009/0217326 A1 | 8/2009 | Hasek |
| 2009/0225760 A1 | 9/2009 | Foti |
| 2009/0245090 A1 | 10/2009 | Budianu et al. |
| 2009/0282241 A1 | 11/2009 | Prafullchandra et al. |
| 2009/0293101 A1 | 11/2009 | Carter et al. |
| 2010/0020770 A1 | 1/2010 | Qin et al. |
| 2010/0023977 A1 | 1/2010 | Peterfreund |
| 2010/0027560 A1 | 2/2010 | Yang et al. |
| 2010/0030578 A1 | 2/2010 | Siddique et al. |
| 2010/0034219 A1 | 2/2010 | Stadelmeier et al. |
| 2010/0042478 A1 | 2/2010 | Reisman |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0158086 A1 | 6/2010 | Kim et al. |
| 2010/0169977 A1 | 7/2010 | Dasher et al. |
| 2010/0287609 A1 | 11/2010 | Gonzalez et al. |
| 2010/0313225 A1 | 12/2010 | Cholas et al. |
| 2011/0010733 A1 | 1/2011 | Godas |
| 2011/0044328 A1 | 2/2011 | Van |
| 2011/0051845 A1 | 3/2011 | Schmidl et al. |
| 2011/0071841 A1 | 3/2011 | Fomenko et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0138434 A1 | 6/2011 | Ulm |
| 2011/0213688 A1 | 9/2011 | Santos et al. |
| 2011/0219229 A1 | 9/2011 | Cholas et al. |
| 2011/0292785 A1 | 12/2011 | Hardin |
| 2012/0008786 A1 | 1/2012 | Cronk et al. |
| 2012/0011567 A1 | 1/2012 | Cronk et al. |
| 2012/0082271 A1 | 4/2012 | Elenes et al. |
| 2013/0097647 A1 | 4/2013 | Brooks et al. |
| 2013/0295978 A1 | 11/2013 | Ruohonen et al. |
| 2014/0169317 A1 | 6/2014 | Gao et al. |
| 2019/0238917 A1 | 8/2019 | Hardin |
| 2020/0067747 A1 | 2/2020 | Hardin |
| 2020/0099966 A1 | 3/2020 | Caputo |
| 2020/0374578 A1 | 11/2020 | Hardin |

FOREIGN PATENT DOCUMENTS

| | | |
|---|---|---|
| EP | 0531046 A2 | 3/1993 |
| EP | 0903941 A1 | 3/1999 |
| EP | 1030305 A2 | 8/2000 |
| EP | 1030305 A3 | 9/2002 |
| EP | 0903941 B1 | 3/2004 |
| EP | 1829367 A2 | 9/2007 |
| EP | 2658249 A2 | 10/2013 |
| JP | H06326986 A | 11/1994 |
| JP | H09205407 A | 8/1997 |
| JP | H1041915 A | 2/1998 |
| JP | H10507889 A | 7/1998 |
| JP | H10336608 A | 12/1998 |
| JP | H11220712 A | 8/1999 |
| JP | 2002320213 A | 10/2002 |
| JP | 2003502958 A | 1/2003 |
| JP | 2005519365 A | 6/2005 |
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| JP | 5608136 B2 | 10/2014 |
| JP | 2015008467 A | 1/2015 |
| WO | WO-9809438 A1 | 3/1998 |
| WO | WO-9929108 A1 | 6/1999 |
| WO | WO-0110125 A1 | 2/2001 |
| WO | WO-2004047444 A1 | 6/2004 |
| WO | WO-2004070582 A2 | 8/2004 |
| WO | WO-2005015422 A1 | 2/2005 |
| WO | WO-2006065948 A2 | 6/2006 |
| WO | WO-2012021245 A1 | 2/2012 |

OTHER PUBLICATIONS

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/securit/saml/v2.0/saml-core-2.0-os.pdf).

Cantor, et al., Bindings for the OASIS Security Assertion Markup Language (SAML) V2.0, OASIS Standard, Mar. 2005 (http://docs.oasis-open.org/security/saml/v2.0/).

Siohan et al., "Analysis and Design of OFDM/OQAM Systems Based on Filterbank Theory", IEEE Transactions on Signal Processing, May 2002.

Sorrento Networks, "Solution Architectures for Cable Video-on-Demand", 2002.

UTF-32, IBM, retrieved from http://publib.boulder.ibm.com/infocenter/iseries/v5r3/index.jsp?topic=%2Fnls%2Frbagsutf32.htm on Aug. 28, 2013.

* cited by examiner

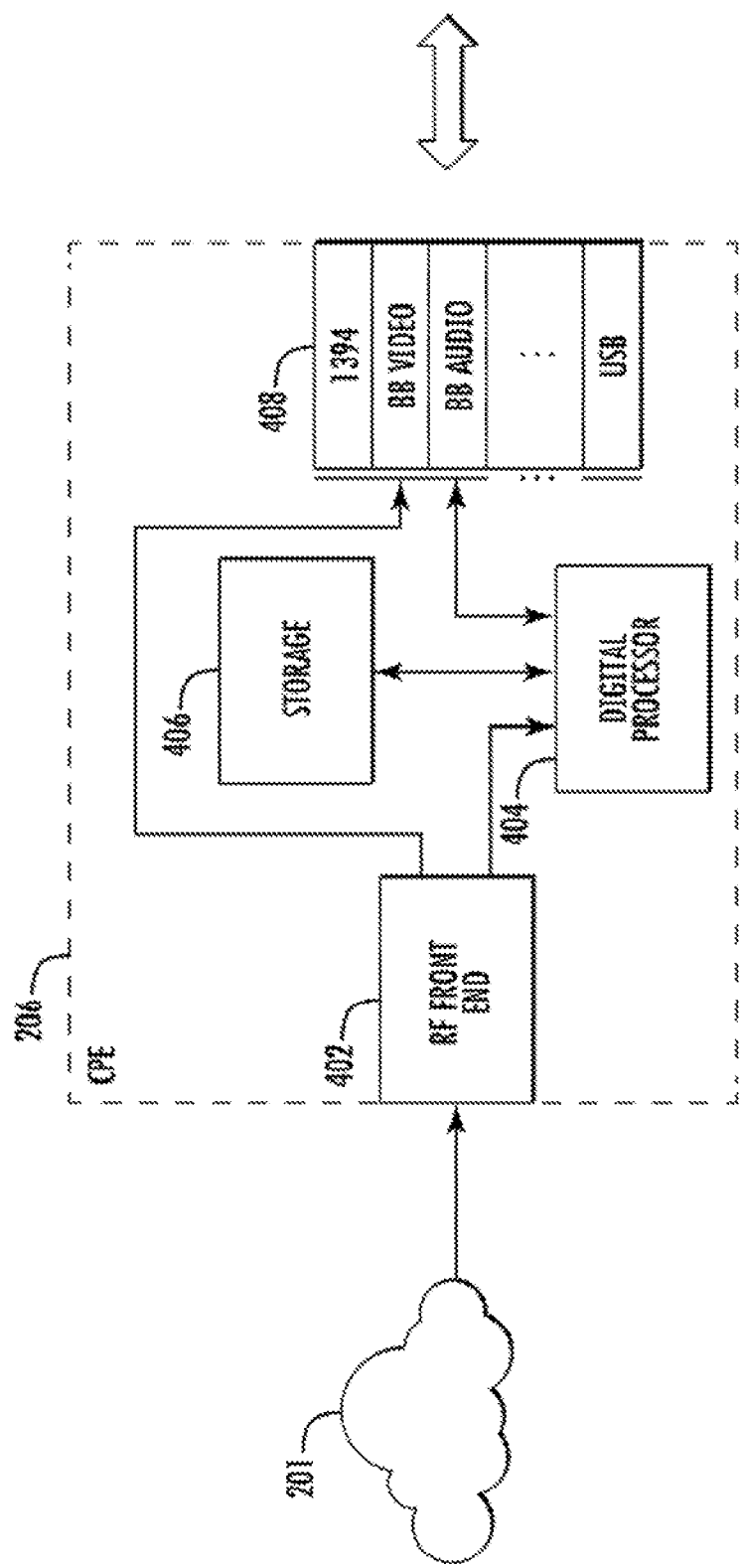

METHOD AND APPARATUS FOR MULTI-BAND DISTRIBUTION OF DIGITAL CONTENT

PRIORITY

This application is a divisional of and claims priority to co-owned and co-pending U.S. patent application Ser. No. 11/013,671 of the same title filed Dec. 15, 2004, and issuing as U.S. Pat. No. 9,723,267 on Aug. 1, 2017, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates generally to the field of digital content distribution. In one exemplary aspect, the invention relates to methods and apparatus to create, transmit, receive and decode wideband transport streams comprising one or more service levels, such as standard definition (SD) and high definition (HD) television programs.

2. Description of Related Technology

In conventional cable television networks, the available spectrum for transmission to customer premises ("downstream spectrum") is divided into RF channels that have a given frequency bandwidth (e.g., 6 MHz in the United States) and occupy spectral slots between a higher and lower bound, such as 54 MHz and 860 MHz. A 6 MHz wide channel is used to carry, for example, a single channel analog television program or a multi-program digital television stream (broadcast or on-demand) or a DOCSIS downstream transport stream to the customer premises.

Since cable signals are transmitted using a Quadrature Amplitude Modulation (QAM) scheme, available payload bitrate for typical modulation rates (QAM-256, QAM-64) used on HFC systems is roughly, e.g., 38 Mbps (for QAM-256). For conventional cable networks that use MPEG-2 audio/video compression technology, the available bandwidth (38 Mbps) on one 6-MHz channel can accommodate a group of approximately 10-12 standard definition television programs. This group of television programs is typically created at a cable headend by using a program multiplexer. FIG. 1 shows functional block diagram of such a multiplexing stage typically used at a headend. In this architecture, a predetermined number of programs in MPEG-2 format comprise a series of inputs 100 to a quantization stage 102. The quantization stage is so called because it has the ability to alter the bitrate of each stream in real time. These rate-altered programs are multiplexed together in a multiplexing stage 104 that produces an output transport stream 106 with the target rate suitable for modulation over a single channel carrier. The multiplexing stage also provides substantially real time feedback to the quantization stage via feedback loop 108.

High Definition Services

In recent times, High Definition television (HDTV) has become an increasingly popular format for transmission and viewing television programming. More and more households and other premises are beginning to purchase High Definition (HD) televisions (HDTV). To keep up with this trend, cable operators have begun offering HD television programs to cable customers, and have recently also started deploying HD "on-demand" (OD) services.

Transmission of an entertainment-quality HD program requires about 4-to-6 times as much bandwidth as an SD program. For example, terrestrial HDTV signals are broadcast using 19.2 Mbps bitrate for video, which is substantially more than the typical 3-4 Mbps rate used for transmission of entertainment-quality SD program over cable networks. In spite of the use of latest video compression techniques, cable operators still require upwards of 12-15 Mbps bitrates for transmission of MPEG-2 Main Profile—High Level (MP@HL) HD programs.

Since transmission of HD programs results in a significantly higher usage of network bandwidth, network operators are looking for improved methods to reduce this burden by creating bitrate-efficient multiplexes of HD programs.

Statistical Multiplexing of HD Signals

Statistical multiplexing is a technique used to efficiently pack multiple programs within a transport stream. This technique relies on the principle that instantaneous bandwidth required to transmit a program fluctuates over time, typically based on the ease of compression of the video content. This makes bandwidth-efficient transmission of multiple programs possible as a multiplex by staggering peak bandwidth requirements of the programs. Conventional approaches to statistical multiplexing have recognized that the greater the number of programs in a multiplex (i.e., "pool size"), the better the chances of using bandwidth efficiently.

However, in the context of transmission of HD programs over cable networks using conventional techniques, the applicability of statistical multiplexing is limited. The main reason for this is that due to the relatively high bitrates of HD programs, a typical transport stream corresponding to a 6 MHz cable channel can only carry 2 to 3 HD programs. This limits the effectiveness of statistically multiplexing HD programs in a multiplex with other HD or SD programs.

Accordingly, a technique that allows for the creation and transmission of transport multiplexes that comprise a larger number of HD programs, thereby improving the opportunity to efficiently group the programs for transmission over networks, will be useful to address the bandwidth burden problem. Such a transport multiplex will typically have a bitrate higher than what can be sent on one RF channel; hence the term "wideband multiplex" can be used to refer to such a multiplex.

U.S. Pat. No. 5,708,664 to Budge, et al. issued Jan. 13, 1998 entitled "Statistical multiplexing" discloses a transmitter for transmitting a plurality of digital signals through a plurality of channels, the channels having a predetermined total allocated bitrate. The transmitter includes a plurality of encoders each associated with one channel, a multiplexer for receiving the encoded digital signals and for transmitting the encoded signals as a stream of data, and operable for adjusting the distribution of the bitrate allocation between and among the encoded signals, and a processing device for providing an indication of a target quality and an actual quality for each channel and for causing the multiplexer to repeatedly adjust the distribution of the bitrate allocation in response to differences between the indicated actual quality and the indicated target quality for each channel so as to equalize differences between the actual and target quality across at least some of the channels. By grouping encoders together in "statistical multiplex groups", and making real time decisions about the bitrate requirements for those encoders, bitrate can be allocated to maximize picture quality for the group. For a variety of different picture sources in a statistical multiplex group, to achieve a target picture quality the bitrate requirements of each will vary with coding difficulty. Thus, a channel within the statistical multiplex group that is experiencing little difficulty in encoding its picture can free bits to channels that are having greater difficulty. The effect is to smooth the picture quality and subjectively improve it.

U.S. Pat. No. 6,219,358 to Pinder, et al. issued Apr. 17, 2001 entitled "Adaptive rate control for insertion of data into arbitrary bit rate data streams" discloses apparatus wherein the rate of insertion of data, such as MPEG table packets, into an outgoing bit stream is varied by a packet handler. The packet handler, which is located in a modulator in a cable television system headend, comprises control logic and a packet router. The actual insertion rate of the outgoing data is based on the bit stream's available capacity for insertion of data and the desired insertion rate of the data. When the available capacity for insertion equals or exceeds the desired insertion rate, the actual insertion rate equals the desired insertion rate. When the available capacity for insertion is less than the desired insertion rate, the actual insertion rate is reduced from the desired insertion rate. The invention dynamically determines the available capacity for insertion and adjusts the actual insertion rate.

United States Patent Publication 20010055336 to Krause, et al. published Dec. 27, 2001 and entitled "Compressed-Video Reencoder System For Modifying The Compression Ratio Of Digitally Encoded Video Programs" discloses a compressed video decoder/encoder (reencoder) system for varying the compression ratio of a compressed video program. The composite reencoder system implements tightly coupled elements for decoding and encoding compressed video data implementing techniques of header forwarding and utilizing an architecture in which a shared motion compensator supports both decoding and encoding operations simultaneously. The reencoder system may be introduced in a statistical multiplexer for generating a compressed video data stream multiplex suitable for use in cable distribution and other video distribution systems.

United States Patent Publication No. 20020085584 to Itawaki, et al. published Jul. 4, 2002 entitled "Statistical multiplex system, statistical multiplex controller and method of statistical multiplex" discloses a statistical multiplex system, a statistical multiplex controller and a method of statistical multiplex, which can assign bit rates to program data and auxiliary data, ostensibly to improve image quality. A statistical multiplex system is provided with: a plurality of image encoders for encoding a plurality of program data; an information encoder for encoding the auxiliary data; a multiplexing apparatus for multiplexing output thereof, and a statistical multiplex controller for controlling each of the image encoders and the information encoder. The statistical multiplex controller is made to set the bit rate to be assigned to the information encoder first, and to assign the remaining bit rates to each of the image encoders.

United States Patent Publication No. 20030083054 to Francesca, et al. published May 1, 2003 and entitled "Multi-channel broadband content distribution system" discloses a system for managing bandwidth in a content distribution system. The system can be incorporated into the content head end of the content distribution system. The system includes a program multiplexer, a multi-channel modulating module, a channel multiplexer, a digital-to-analog converter and a frequency block-up converter, all arranged in a sequential configuration. Packets representing respective content programs are fed to the program multiplexer. The program multiplexer multiplexes the packets into an output queue. How the packets are multiplexed by the program multiplexer into the output queue depends on the specific design and/or application. Packets from the output queue are then fed to the multi-channel modulating module. The multi-channel modulating module receives the packets and routes them to various modulators representing corresponding RF channels. The various modulators then modulate the respective packets to generate corresponding RF signals. These RF signals are then multiplexed by the channel multiplexer into a multi-channel RF signal. The multi-channel RF signal is then forwarded to the digital-to-analog converter for conversion into an analog, multi-channel RF signal. The frequency block-up converter then takes the analog multi-channel RF signal and shifts its to a higher frequency band for transmission. The shifted analog multi-channel RF signal is then transmitted over a medium to one or more customer premises equipment. Notwithstanding the foregoing, this solution fails to provide mechanisms for performing the important steps of encryption at a headend, and corresponding decryption at the customer premises equipment (CPE). Also, a corresponding CPE configuration that can receive wideband signals (essential to the operation of such a system) is not provided.

Based on the foregoing, it is evident that while the prior art has in general recognized the utility of wideband content transmission, it lacks apparatus and methods to adequately implement this approach. Specifically, prior art does not teach how to create transport multiplexes of the type needed to efficiently and effectively transport such wideband signals by enforcing various multiplexing rules across multiple carriers, nor does it address backwards compatibility with legacy devices.

What is needed are improved apparatus and methods to create, transmit and receive wideband multiplexes that allow flexible encryption and multiplexing of programs and program information tables, and which provide backwards compatibility with legacy customer premises equipment. Such improved apparatus and methods would also, inter alia, allow for a larger statistical multiplex pool size, thereby increasing the leverage in efficiency provided by the statistical multiplexing approach in an HD environment.

SUMMARY OF THE INVENTION

The present invention addresses the foregoing needs by providing, in various embodiments, methods and apparatus for wideband transmission of content.

In a first aspect of the invention, a content distribution system adapted for efficient transmission of High Definition (HD) programs is disclosed. In one embodiment, the system comprises: first apparatus adapted to receive a plurality of HD programs; server apparatus operatively coupled to the first apparatus and configured to process the plurality of HD programs based on a plurality of operator-controlled rules; and transmission apparatus configured to transmit the processed programs across a plurality of RF channels, at least a portion of the channels being non-contiguous. Portions of each of the programs are transmitted using the plurality of RF channels. The processing of the programs further comprises the insertion of non-content data (such as PID or SI data) into the programs, the data being useful for receiving the programs at a receiver.

In a second aspect of the invention, improved customer premises equipment (CPE) for use in a content-based network is disclosed. In one embodiment, the CPE is adapted to receive transmitted content substantially simultaneously from a plurality of information carriers present on a plurality of RF channels, and comprises: a tuner stage capable of receiving first signals simultaneously from the plurality of carriers; a demodulator stage adapted to demodulate a plurality of the first signals; a decryption stage adapted to decrypt at least a portion of the demodulated signals; and content reassembly apparatus operatively coupled to the decryption stage, the reassembly apparatus adapted to reassemble the decrypted and demodulated signals into the transmitted content.

In a third aspect of the invention, a method of operating a cable network having a plurality of legacy-capable CPE and a plurality of "wideband" CPE operatively coupled thereto is disclosed. In one embodiment, the method comprises: distributing a first program comprising a plurality of content elements, the act of distributing comprising sending the content elements over multiple carriers of the network; and providing program information data as part of the distributing such that the wideband CPE can receive and decode the first program, the program information being structured so as to preclude the legacy-capable CPE from decoding the first program.

In a fourth aspect of the invention, improved statistical multiplex apparatus useful in a cable network is disclosed. In one embodiment, the apparatus comprises: a first process adapted to selectively extract content data packets associated with a plurality of different programs from a plurality of N input queues; and a second process adapted to selectively allocate the extracted content data packets to a plurality of M RF channels; wherein the packets associated with at least one of the plurality of different programs are distributed across multiple ones of the M RF channels. In one variant, the first and second processes are controlled according to "round-robin" algorithms. In a second variant, the first process comprises a round-robin algorithm, while the second comprises a "most-loaded" or "least-loaded" algorithm.

In a fifth aspect of the invention, an improved content distribution system is disclosed, comprising: first apparatus adapted to receive a plurality of content; content server apparatus operatively coupled to the first apparatus and configured to process the plurality of content based on a plurality of operator-controlled rules; and transmission apparatus configured to transmit the processed content across a plurality of RF channels, at least a portion of the channels being non-contiguous; wherein at least portions of a program contained within the content are respectively transmitted using multiple ones of the RF channels.

In a sixth aspect of the invention, a method of improving the bandwidth utilization of an associated cable system for delivery of high definition (HD) video is disclosed. In one embodiment, the cable system comprises a content distribution system having apparatus adapted to receive a plurality of content, content server apparatus configured to process the plurality of content based on a plurality of operator-controlled rules, and transmission apparatus configured to transmit the processed content across a plurality of at least partly contiguous RF channels, and the method comprises: providing a plurality of HD programs and a plurality of SD programs as part of the content; providing a plurality of other data programs as part of the content; and multiplexing the HD, SD, and other data programs onto the plurality of RF channels.

In a seventh aspect of the invention, a head-end content distribution system for use in a cable network is disclosed. In one embodiment, the system comprises: at least one interface adapted to receive a plurality of input content streams; a multiplexer that processes the plurality of input content streams to produce a plurality of output streams in multiplexed form; an encrypter stage that encrypts the plurality of output streams; a modulation stage that modulates the encrypted output streams onto a plurality of carriers; and a frequency upconversion stage that translates the modulated signals into RF channels for delivery over multiple carriers within the network.

In an eighth aspect of the invention, a method of operating CPE within a cable network is disclosed. In one embodiment, the network comprises a plurality of legacy-capable CPE and a plurality of wideband CPE operatively coupled thereto, and the method comprises: receiving at least one first program comprising a plurality of content elements, the act of receiving comprising receiving the content elements over multiple carriers of the network; and extracting program information data as part of the act of receiving such that the wideband CPE can decode the at least one first program, the program information being structured so as to preclude the legacy-capable CPE from decoding the at least one first program.

In a ninth aspect of the invention, a method of providing cable network services to a service area is disclosed. In one embodiment, the service area has a plurality of first CPE installed therein, the first CPE being adapted to receive at least one program over a first number of channels of the cable network. The method comprises: providing second CPE to a first portion of the service area (such as via a planned, program, or incidental CPE upgrade), the second CPE being adapted to receive at least one program simultaneously over a second number of RF channels of the cable network; transmitting at least one program over the first number of channels to the service area for a first period of time; providing second CPE to a second portion of the service area; and transmitting at least one program over the second number of channels to the service area thereafter. The operation of the newer (upgraded) wideband CPE using a number of channels less than its capacity for a period of time allows for migration of older CPE to the newer capability over time without leaving the older CPE users "stranded" of forcibly requiring them to upgrade or lose service.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which:

FIG. 4 is a block diagram illustrating one exemplary embodiment of the CPE of the present invention showing various components thereof.

DETAILED DESCRIPTION OF THE INVENTION

Figure 1:
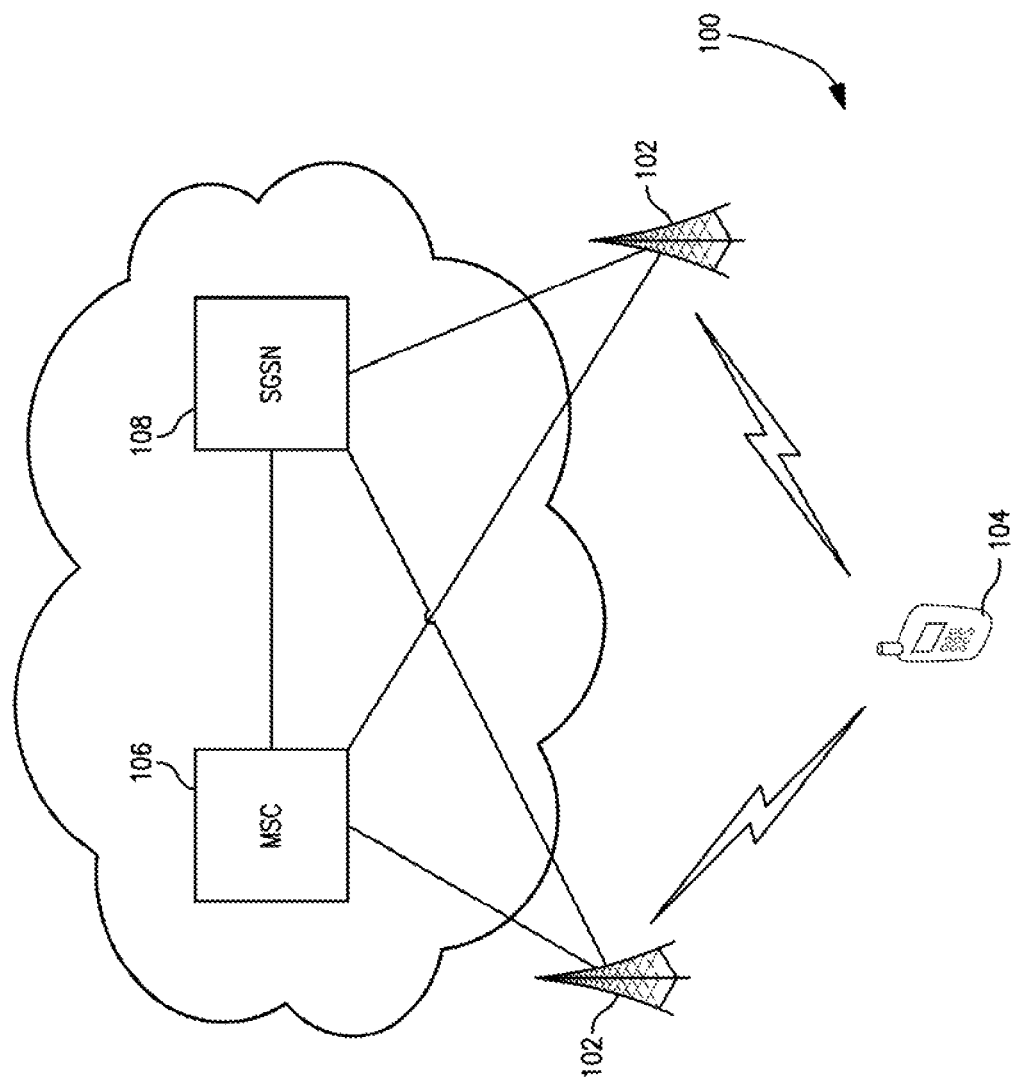
FIG. 1 is a functional block diagram illustrating an exemplary prior art multiple-input, single-output multiplexer with a quantization step, and configured to perform rate shaping.

Reference is now made to the drawings wherein like numerals refer to like parts throughout.

As used herein, the term "on-demand" or "OD" is meant to include any service that enables real time, quasi-real time (e.g. "trick" mode delivery) or even non-real time delivery of content such as audio and/or video programs at any resolution, or data, based on some action of a user, customer, or its proxy. Such content may be, for example, stored or temporarily cached on a server or other device, or streamed directly from a source.

As used herein, the terms "multi-systems operator" and "MSO" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, PANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, 802.15, 802.16 (WiMAX), ATM, X.25, Frame Relay, 3GPP, 3GPP2, WAP, SIP, UDP, FTP, RTP/RTCP, H.323, etc.).

As used herein, the term "QAM" refers generally to modulation schemes used for sending signals over coaxial cable or other networks. Such modulation scheme might use any constellation level (e.g. QAM-16, QAM-64, QAM-256 etc.) depending on the details of a particular cable or other (e.g., satellite) network. A QAM may also refer to a physical channel modulated according to said schemes.

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "content" refers to audio, video, graphics files (in uncompressed or compressed format), icons, software, text files and scripts, data, binary files and other computer-usable data used to operate a client device and produce desired audio-visual effects on a client device for the viewer.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli devices, J2ME equipped devices, cellular telephones (including "smart phones"), wireless nodes, or literally any other device capable of interchanging data with a network.

Similarly, the terms "Customer Premises Equipment (CPE)" and "host device" refer to any type of electronic equipment located within a customer or user premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes electronic equipment such as set-top boxes, televisions, Digital Video Recorders (DVR), gateway storage devices (Furnace), and ITV Personal Computers.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form, which is adapted to provide data, files, applications, content, or other services to one or more other devices or entities on a computer network.

As used herein, the term "legacy" refers to any component, system, process, or method which is prior to the most current generation, revision, or modification of such component, system, process, or method.

Overview

The present invention discloses apparatus and methods to create, transmit and receive wideband multiplexes that allow for efficient and flexible multiplexing of programs and program information tables. These apparatus and methods also advantageously provide backwards compatibility with legacy customer premises equipment (CPE), such that legacy CPE can receive and decode "legacy" content, while the wideband CPE of the present invention within the same network can receive and decode both the legacy content and the content (e.g., HD programs) distributed over the wideband carrier pool.

In one exemplary embodiment of the invention (adapted for HFC cable networks), elements in both the head-end and CPE are specially adapted to utilize existing transmission infrastructure to transmit and receive both the multiplexed wideband and legacy content.

At the head-end, transport stream processing comprises statistical multiplexing of content obtained via a plurality of input streams into one or more common "multiplexes" (Multi-program transport streams, or MPTS). These multiplexes are then split or divided across multiple different physical carriers for transmission across the network (including modulation, encryption, and RF upconversion). System information (SI) tables are also created at the head-end for inclusion within the transmitted signals. Any packet ID (PID) re-mapping performed by the modulators is optionally made consistent across the entire statistical multiplex pool.

The receiving CPE contains multiple tuners (or a single wide-band tuner) that allow the CPE to receive the signals from all of the relevant physical carriers simultaneously. The carriers are demodulated, and channel-based decryption and basic demultiplexing (recombination) is performed. The streams are then delivered to a transport demultiplexor which demultiplexes all of the streams resident within the statistical multiplex.

Advantageously, the present invention may be implemented using existing head-end infrastructure; i.e., via software modifications to existing rate shaper and multiplexer devices. Similarly, only minimal modifications to the CPE (including the addition of one or more wideband tuners and software modifications) are required to implement the invention.

One salient benefit obtained by implementing the invention relates to the increase or enhancement in the size of the "pool" available to the HD statistical multiplex processes of the head-end. Specifically, an increased number of variable rate content streams can be included in a multiplex, and the multiplex can be distributed over multiple different carriers, which collectively makes the statistical multiplexing process more effective.

Description of Exemplary Embodiments

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures where the efficient allocation of larger-bandwidth programs or content is desired. Hence, the following description is merely exemplary in nature.

It will also be appreciated that while described generally in the context of a network providing service to a customer (i.e., home) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth allocation between three service levels (SD, HD, and UHD). As another option, multiple levels or rates may be present with one of the aforementioned service levels, such as where the SD level includes levels SD1, SD2, ... SDn, and the HD level similarly includes HD1, HD2, ... HDn, with each of these sub-levels having different data rates and/or other characteristics. Relevant portions of the methods and apparatus described in co-owned U.S. patent application Ser. No. 10/881,979 filed Jun. 29, 2004, entitled "Method And Apparatus For Network Bandwidth Allocation", and issued as U.S. Pat. No. 8,843,978 on Sep. 23, 2014, incorporated herein by reference in its entirety, may also be used consistent with the invention described herein.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, any references to "RF carriers" herein are in no way limited to coaxial cable systems; the various approaches of the present invention may also readily be applied to wireless environments such as, e.g., satellite systems.

Although the methods and apparatus of the present invention have been described with reference to Internet Protocol (IP) based networks, it will be appreciated that the teachings presented herein are equally applicable to networks that use other transport protocols.

Lastly, while described primarily in the context of a downstream "broadcast" paradigm, it will be understood that the various aspects of the present invention are equally applicable regardless of whether a given program is intended for broadcast or supplied via an on-demand (OD) or other such "user pull" service.

Figure 2:
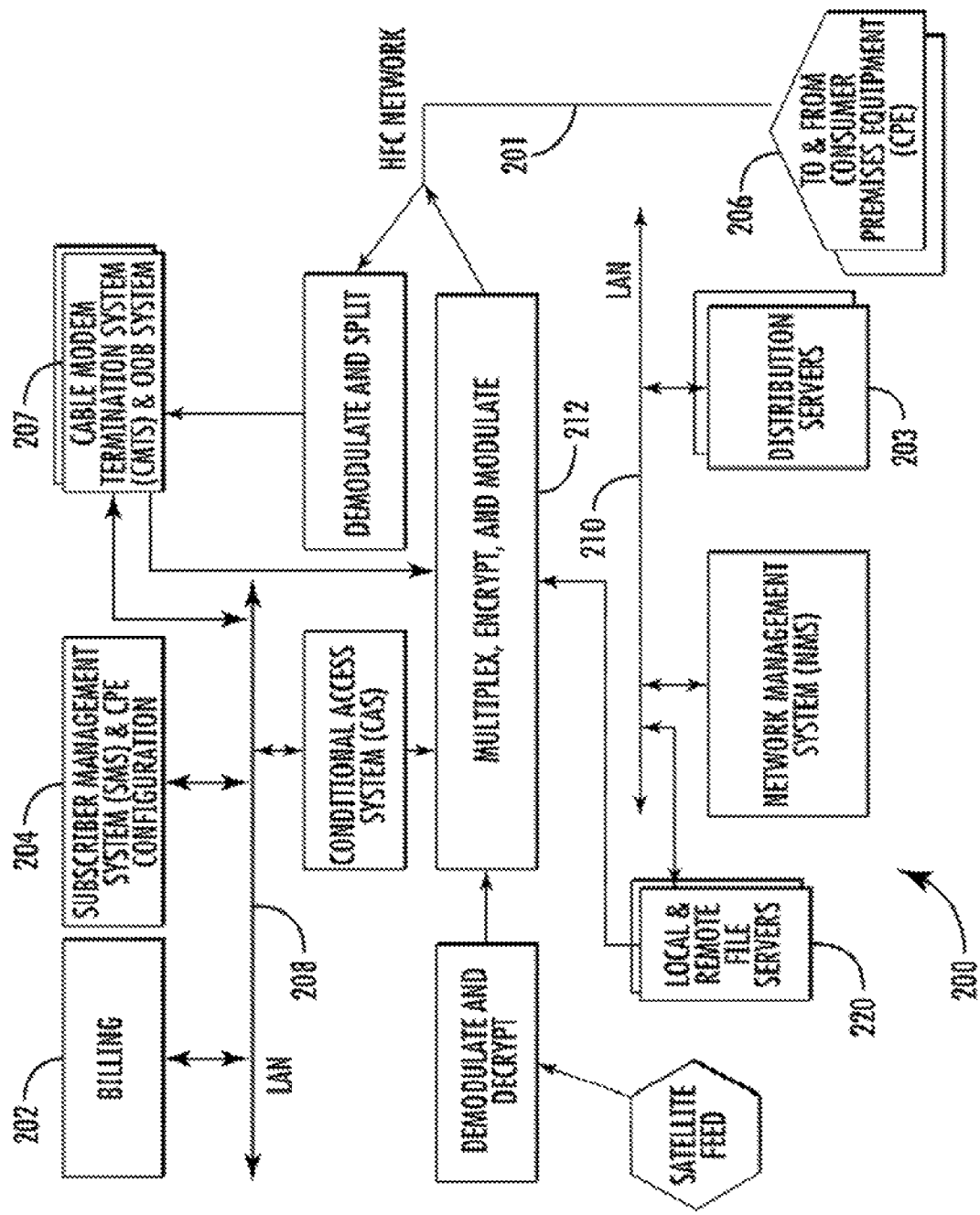
FIG. 2 is a functional block diagram illustrating one exemplary embodiment of an HFC cable network architecture useful with the present invention.

Referring now to FIG. 2, one exemplary embodiment of a network and head-end architecture useful with the present invention is described. As shown in FIG. 2, the head-end architecture 200 comprises typical head-end components and services including a billing module 202, subscriber management system (SMS) and CPE configuration management module 204, cable-modem termination system (CMTS) and OOB system 207, as well as LAN(s) 208, 210 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 2 is high-level, conceptual architecture and that each MSO may have multiple head-ends deployed using custom architectures.

The architecture 200 of FIG. 2 further includes a multiplexer/encrypter/modulator (MEM) 212 coupled to the HFC network 201 adapted to "condition" content for transmission over the network, as subsequently described in detail herein with respect to FIGS. 2a-2c. In the present context, the distribution servers 203 are coupled to the LAN 210, which provides access to the MEM 212 and network 201 via one or more file servers 220. VOD servers (not shown) may be coupled to the LAN 210 as well, although other architectures may be employed (such as for example where the VOD servers are associated with a core switching device such as an 802.3z Gigabit Ethernet device).

As previously described, information is carried across multiple channels. Thus, the head-end must be adapted to acquire the information for the carried channels from various sources. Typically, the channels being delivered from the head-end 200 to the CPE 206 ("downstream") are multiplexed together in the head-end and sent to neighborhood hubs (not shown).

Content (e.g., audio, video, etc.) is provided in each downstream (in-band) channel associated with the relevant service group, as subsequently described herein. To communicate with the head-end, the CPE 206 uses the out-of-band (OOB) or DOCSIS channels and associated protocols. The OCAP specification provides for networking protocols both downstream and upstream.

In another embodiment, the network infrastructure includes one or more on-demand file or "carousel" functions. Specifically, the present invention contemplates that not only will more traditional movie (e.g., MPEG) data be allocated and delivered though the bandwidth allocation mechanisms described herein, but also data for interactive applications or other types of applications. For example, in a fashion not unlike existing approaches to ordering an on-demand (OD) movie, an application would request data, images, links, audio files, video files, and the like in an on-demand fashion. These unique data types may comprise single files, or be combined into a single or multiple data carousels, with each carousel potentially having a different data rate. Upon receiving an OD service request, the allocation algorithm can optimize the placement of these sessions on QAM resources for delivery to the requestor. Hence, the OD downstream service can be considered a third and separate level of service (i.e., SD, HD, and OD), or alternatively can be considered as one or more subclasses within the existing levels; i.e., where SD includes SD-OD, and HD includes HD-OD.

Many other permutations of the foregoing system components and communication methods may also be used consistent with the present invention, as will be recognized by those of ordinary skill in the field.

Figure 2A:
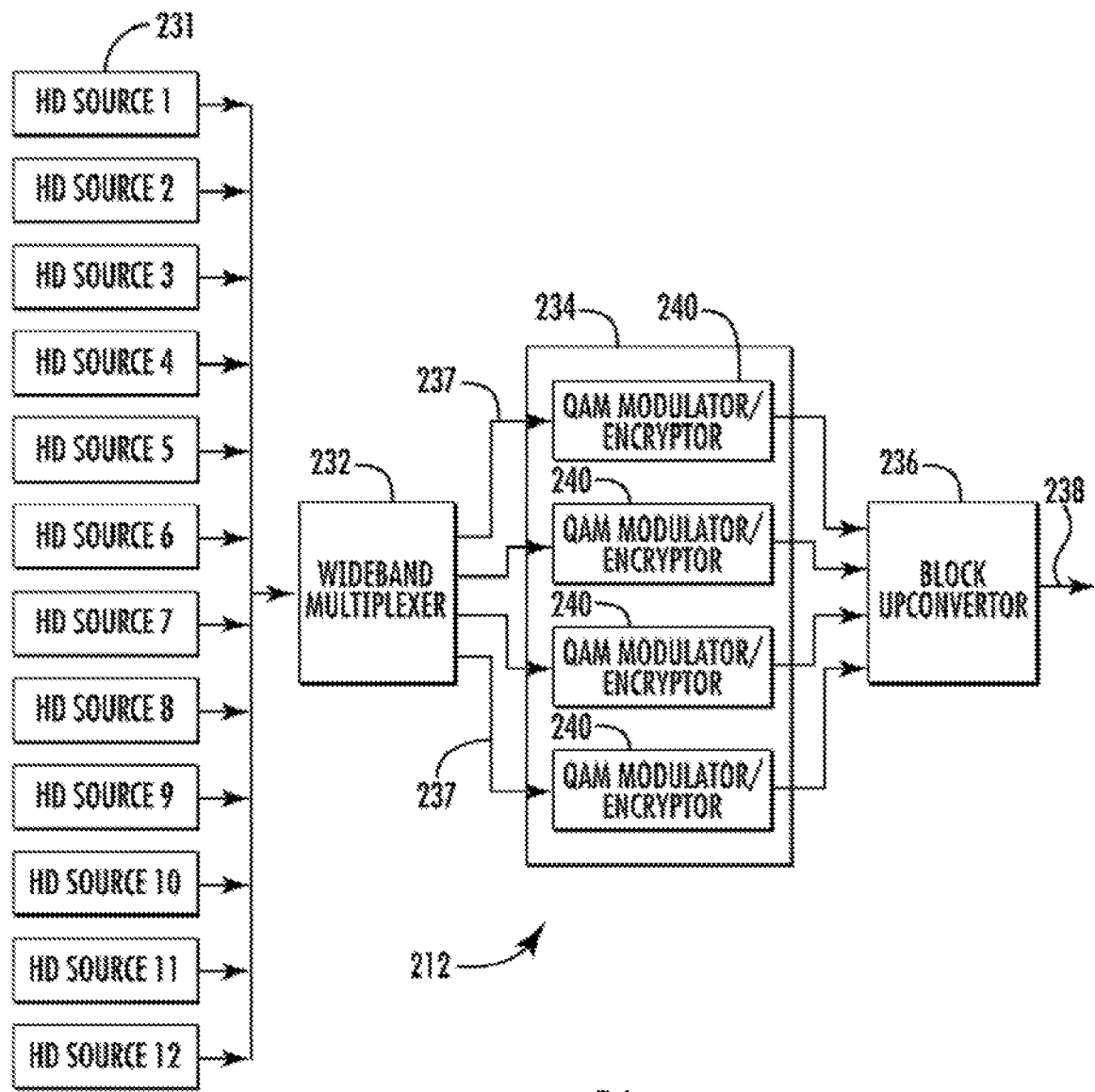
FIG. 2a is a functional block diagram illustrating one exemplary embodiment of the multiplexer, modulator and encryption module (MEM) of the network of FIG. 2, in which a plurality (e.g., 12) HD programs are multiplexed and modulated on multiple QAM carriers.
Figure 2B:
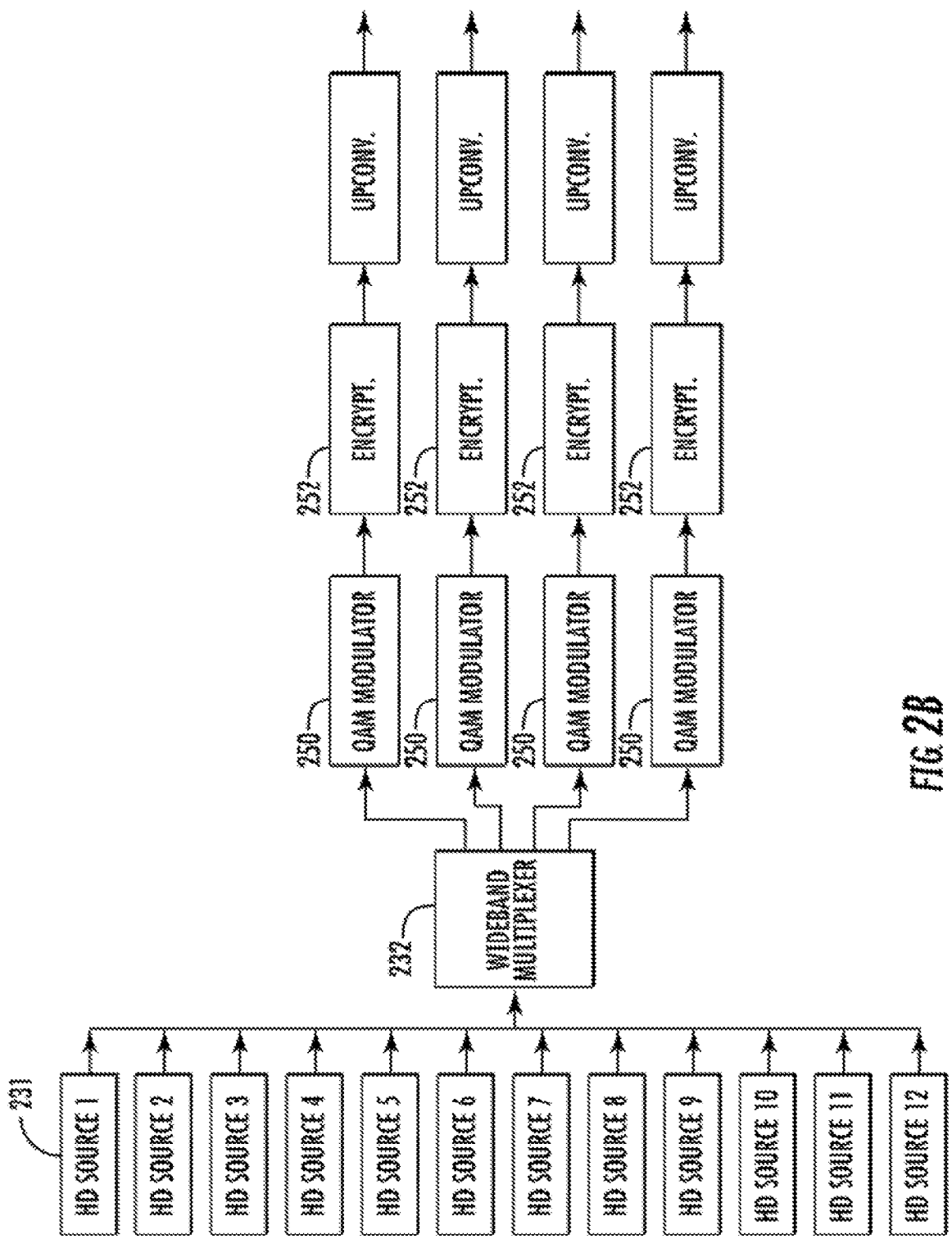
FIG. 2b is a functional block diagram illustrating a second exemplary embodiment of the multiplexer, modulator and encryption module (MEM) of the network of FIG. 2, wherein separate modulators and encryptors are utilized.

Referring now to FIG. 2a, a first embodiment of the MEM apparatus 212 according to the invention is described. Shown in FIG. 2a are a plurality (e.g., 12) different HD streams or sources 231, which may comprise for example 12 distinct HD content programs, or even a transport stream comprising multiple programs. Hence, the term "program" is used herein to refer one or more individual content-based programs. Each stream utilizes a given data compression rate (e.g., 12 Mbps) from the head-end to the CPE over the cable network. It will be appreciated that the representation of FIG. 2a comprises a logical representation only, i.e., the various HD sources 231 may be input on the same physical connection, on individual physical connections, or any combinations thereof.

Due to the maximum bandwidth limitation on each RF channel associated with the network, conventional techniques require that up to three HD programs can be multiplexed and transmitted on a single QAM carrier. According to an embodiment of the present invention, these 12 content programs are input to a "wideband multiplexer" 232 (see FIG. 2a). This multiplexer element 232 performs the function of quantization (as needed), and transfer of incoming packets to four target outputs 237 each being input to one of a bank 234 of four modulator/encryption units 240. It will be noted that while encryption and modulation functions are shown in a combined unit 240 in FIG. 2a, the implementation of the modulation and encryption functions can be performed separately or together as desired. See, e.g., FIG. 2b, wherein four separate modulation units 250 and encryption units 252 are utilized.

The baseband outputs of four (e.g., QAM) modulators 240 are then fed to a block upconverter 236 that upconverts the baseband signals (whether via an intermediate frequency (IF) or a "direct conversion" approach) and produces an output 238 from which each modulated QAM signal is assigned to an appropriate RF channel to be transmitted over the cable network 201. RF upconversion apparatus is well known in the art, and accordingly is not described further herein.

Figure 2C:
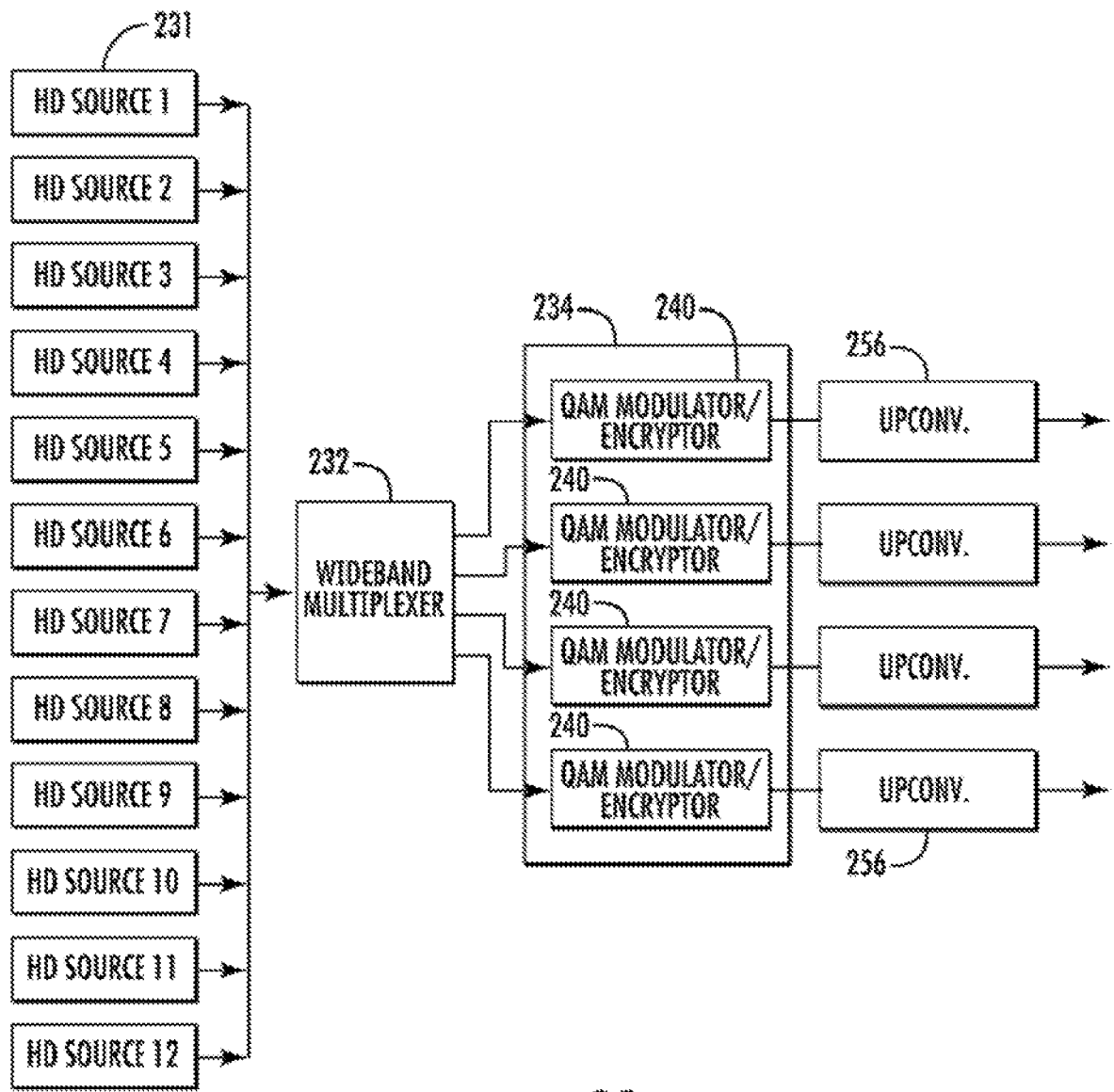
FIG. 2c is a functional block diagram illustrating a third exemplary embodiment of the multiplexer, modulator and encryption module (MEM) of the network of FIG. 2, wherein separate upconverters are used.

Similar to the modulators/encryptors 240 described above, the block upconversion process 236 may be performed using individual upconversion apparatus 256 if desired (see FIG. 2c). Furthermore, the upconversion apparatus can be combined with the modulation and/or encryption units 240 if desired.

It will also be recognized that the wideband multiplexing function 232 can be performed in two or more stages or using various aggregation schemes if desired. For example, in the context of FIG. 2a, the twelve sources 231 may be aggregated into, e.g., three groups of four (4), wherein a "local" or first-stage wideband multiplex function exists for each of the three groups, and the three multiplexed outputs of each group are then multiplexed using a second-stage wideband multiplexer. The statistical and control processes controlling the first and second stages of multiplexing may be logically coupled (such as via an interprocess communication mechanism of the type well known in the art) or alternatively independent, depending on the desired result. A coupled set of multiplex stages may be used for example to provide "intelligent" HD program distribution across the various available RF channels based on downstream demand, upstream conditions, etc.

The MEM apparatus 212 may take any number of physical forms, comprising for example one of a plurality of discrete modules or cards within a larger network device of the type well known in the art, or even the cable modem termination system (CMTS). The MEM 212 may also comprise firmware, either alone or in combination with other hardware/software components such as those previously described. Alternatively, the MEM 212 may be a stand-alone device disposed at the head end or other location. Numerous other configurations may be used. The MEM 212 may also be integrated with other types of components (such as satellite transceivers, encoders/decoders, etc.) and form factors if desired.

Hardware within the MEM 212 included, e.g., digital processor(s), storage devices, and a plurality of data interfaces for use with other network apparatus such as IP routers and other packet network devices, network management and provisioning systems, local PCs, etc. Other components which may be utilized within the MEM 212 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required. These additional components and functionalities are well known to those of ordinary skill in the cable and embedded system fields, and accordingly not described further herein.

In one embodiment, the MEM 212 features a statistical multiplexer function that is generally similar to an existing ("legacy") rate shaper used in non-wideband applications. A software modification is utilized that allows for the rate shaper to output portions of the multi-program transport stream (MPTS) generated by the existing multiplexer to the different physical outputs 237. These outputs 237 feed the QAM modulators that apply encryption and feed the block upconverter as shown in FIG. 2a.

N:M Wideband Multiplexing

Figure 3:
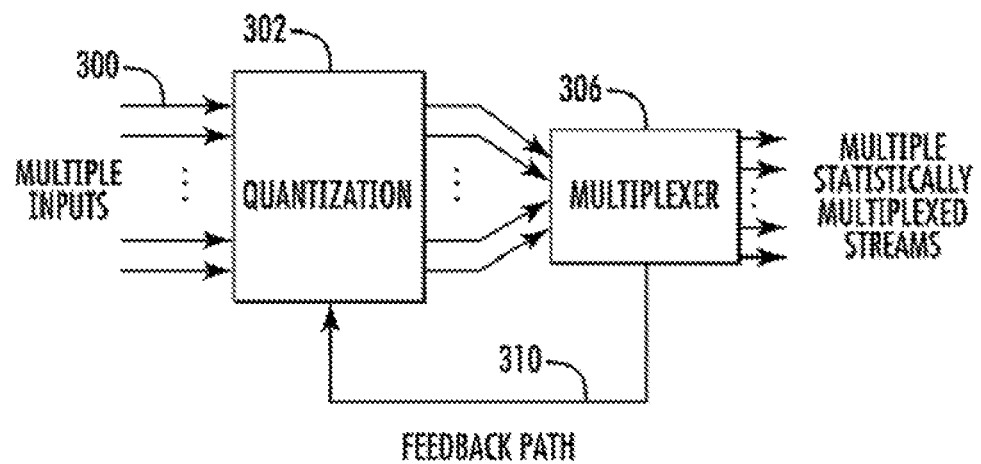
FIG. 3 is a functional block diagram illustrating one exemplary embodiment of the wideband multiplexer according to the present invention, showing quantization, multiplexing and encryption functions.

Unlike conventional stream multiplexing of the type shown in FIG. 1, wideband transport streams generally require multi-input, multi-output multiplexing. FIG. 3 shows an example functional block diagram of a multiplexer 232 that performs such a function. The Figure shows multiple content programs or streams 300 being input to a quantization unit 302. In the following discussion, the number of input programs or streams 300 is denoted by "N". The N programs that comprise the input multiplex 300 could be derived from, e.g., one or more physical inputs; hence, the illustrated configuration is logical in nature. The quantization unit 302 is provided feedback 310 by the multiplexing stage 306, the feedback comprising information related to the instantaneous bandwidth available on each out-going transport multiplex. It should be noted that the separation and logical placement of the quantization function 302 and the multiplexing/encryption function 306 in the exemplary embodiment of FIG. 3 is purely illustrative; the two functions can be combined into a single function and/or integrated into the same hardware, or alternatively could split across different logical stages.

Various rules defining how the total number "N" of input programs are mapped to "M" outputs (an N:M multiplexing scheme) can be implemented consistent with the present invention. For example, in one embodiment, a packet belonging to a particular input program or stream 310 can appear on any of the M outputs, depending on implementation rules relating to one or more parameters such as instantaneous bandwidth availability (e.g., according to a "round robin" or other such scheme of the type well known in the art). Alternatively, a "most loaded" or "least loaded" type approaches can be utilized. See, e.g., U.S. patent application Ser. No. 10/881,979 filed Jun. 29, 2004 previously referenced herein.

Specifically, different multiplexing rules can be applied to different processes within the statistical multiplex. In one embodiment, a first decision is made regarding which packets to pull out of the "N" incoming program (packet) queues. A first rule could direct the algorithm to pull packets preferentially from those queues with the most packets. Alternatively, packets could be pulled out of the queues in a round-robin fashion. In yet another implementation, packets could be transferred out of the queues by evaluating which packets arrived earliest at their corresponding program queue, and subsequently assigning bandwidth to the earliest-arrived packets.

A second decision is also made within the exemplary statistical multiplexer regarding which of the "M" available output carriers to assign those packets pulled out of the input (program) queues to. This decision can also be made according to any number of algorithms, including for example round-robin, least-loaded or most-loaded.

Hence, the statistical multiplexing engine used within the wideband multiplexer 232 of the illustrated embodiment can utilize multiple related or independent processes in order to provide the desired statistical performance.

In another exemplary embodiment, packets from an input program can be constrained to appear on a smaller subset of the M outputs (e.g. only one or two outputs). One benefit of such a constraint is to create transport streams wherein some programs are simultaneously decodable by both legacy (i.e., non-wideband) CPE and the wideband CPE of the present invention.

This approach of imposing one or more constraints also advantageously aids in maintaining operability and compatibility during future wideband CPE deployments or upgrades. For example, a wideband CPE deployed with the capability to receive four QAM channels simultaneously via its single or multiple tuners (described subsequently herein) will be able to receive programming sent according to a "constrained" multiplex scheme on an eight-channel wideband signal in future deployments, if these programs are constrained to occupy four or less channels out of eight.

This approach also provides a migration path as newer, wider-band CPE are progressively introduced into an area. Specifically, in the context of the foregoing example, the downstream multiplex can be constrained to 4-channel wideband scheme for a period of time after the 8-channel CPE begins distribution with the service area of interest, thereby allowing for the eventual replacement of all 4-channel CPE with 8-channel CPE. This avoids situations where 4-channel CPE users are left "stranded" in a purely 8-channel programming environment.

The present invention further contemplates multi-mode operation; i.e., providing the head-end MEM 112 and the CPE 206 with the ability to vary their rule scheme (even dynamically) in order to accommodate changes in programming, system operability, maintenance, etc. For example, where an 8-channel CPE is receiving an 8-channel downstream multiplex, the CPE can be selectively switched to constrained 4-channel operation such as in response to loss of one of its channels (e.g., due to failure of the QAM modulator associated with that channel). This switching can be according to a preprogrammed pattern or rule, or may be conducted dynamically based on, e.g., a "constraint" algorithm, so long as the affected CPE and head-end are in communication or otherwise apply a similar algorithm at the same time.

Similarly, rules-based input-output mapping also is helpful if changing channel conditions change the available bandwidth on one or more carriers over the duration of program transmission.

PID Re-Mapping, Reordering, and Table Generation

Depending on the rules of implementation of the N:M wideband multiplexer 306, each of the M outputs individually may or may not be compliant with various broadcast and cable television transmission standards. In one embodiment, a packet ID (PID) remapping and table generation stage within the MEM 212 allows system operator to set the level of compliance by controlling generation of program-specific information (PSI) tables (e.g., PAT and PMT), System Information (SI) tables and other features such as PID remapping, deciding which tables to send on which QAM carrier, and so forth. In an exemplary embodiment of the invention, the PID remapping/table generation function is implemented as a software process within the quantization unit 302 of FIG. 3 (i.e., prior to multiplexing), such that PSI and any other SI tables have to be generated only once. Packets belonging to a single SI or PSI table could appear on different inputs at the output of the quantizer 302.

In one embodiment of the head-end multiplexing apparatus 212 of the invention, each of the individual M outputs created by the multiplexers 306 can comprise a fully compliant MPEG stream. In another embodiment, the M output streams are combined together to form a compliant MPEG transport stream, but may not be compliant individually. Other schemes will also be recognized by those of ordinary skill provided the present disclosure.

Exemplary CPE and Tuning

Figure 4A:
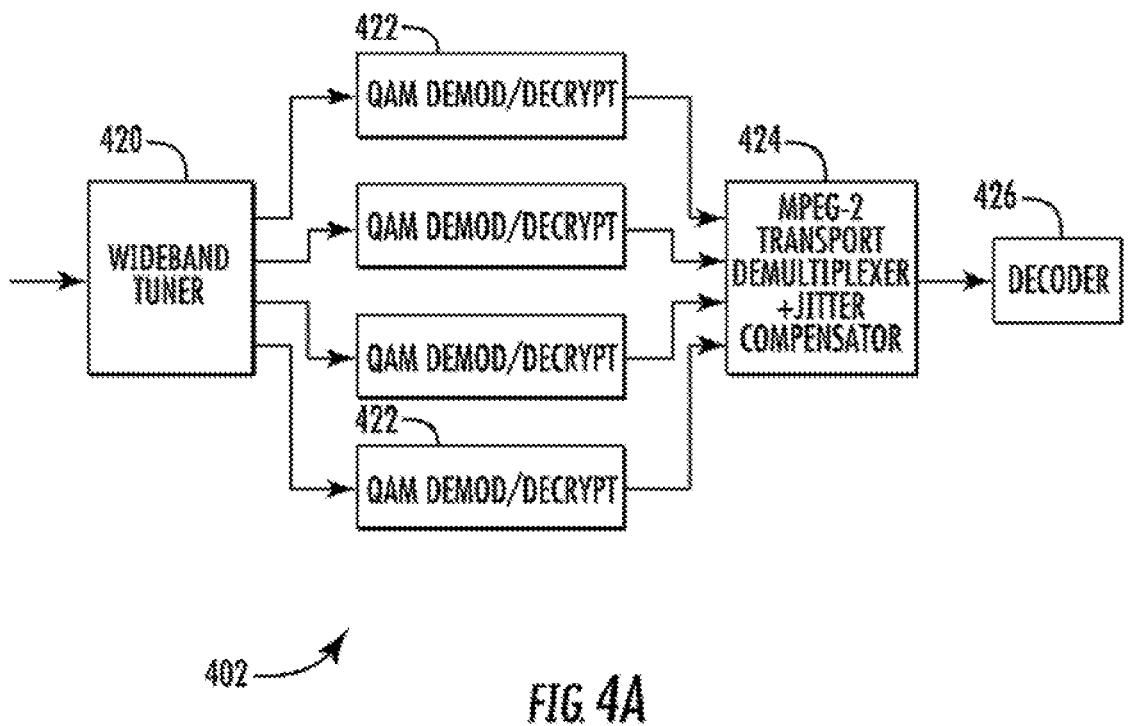
FIG. 4a is a functional block diagram of the CPE of FIG. 4 showing the receipt of a wideband signal, processing of the signal, and transfer to an HD decoder.

FIGS. 4 and 4a illustrate a first embodiment of the improved wideband CPE 206 according to the present invention. As shown in the simplified diagram of FIG. 4, the device 206 generally comprises and OpenCable-compliant embedded system having an RF front end 402 (including tuner, demodulator/decryptors, and demultiplexer as discussed with respect to FIG. 4a below) for interface with the HFC network 201 of FIG. 2, digital processor(s) 404, storage device 406, and a plurality of interfaces 408 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 4 for simplicity) various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 206 of FIG. 4 is also provided with an OCAP 1.0-compliant application and Java-based middleware which, inter alia, manages the operation of the device and applications running thereon. It will be recognized by those of ordinary skill that myriad different device and software architectures may be used consistent with the wideband tuning and demultiplexing functions of the present invention, the device of FIG. 4 being merely exemplary. For example, different middlewares (e.g., MHP, MHEG, or ACAP) may be used in place of the OCAP middleware of the illustrated embodiment.

FIG. 4a illustrates one exemplary embodiment of the RF front end 402 of the CPE 206 of FIG. 4. The front end 402 includes a wideband tuner 420 (which may comprise for example a single wideband tuner such as the WBR device manufactured by Broadlogic Network Technologies, or a plurality of individual tuners effectively aggregated to provide wideband tuner functionality), one or more QAM demodulators and decryptors 422 (which may be separate or integrated devices as previously discussed with respect to the head-end apparatus), and a transport stream demultiplexer (and jitter compensator) 424. A decoder stage 426 is also provided at the (logical) output of the demultiplexer 424, such as for example an MPEG2 decoder of the type well known in the art.

As is well known, the decryption stage of an authenticated CPE 206 performs unscrambling of the program of interest by using appropriate key stream. In the illustrated embodiment, the decryption function is implemented together with the demodulators 422. Therefore, packets of a wideband content program will be decrypted in the multiple decryption engines within the modules 422 and subsequently de-multiplexed back together for decoding purposes. However, other arrangements may be used, such where the decryption stage is implemented after the demodulation 422 and the de-multiplexing/jitter compensation 424 is completed.

As previously noted, it is desirable that the present embodiment of the wideband CPE 206 operate in both wideband multiplexed and legacy deployments. To receive a desired program using legacy CPE, the CPE must be able to tune to receive to the appropriate RF channel, demodulate the received signal, decrypt the demodulated signal if needed, de-multiplex the demodulated and decrypted multiplex, and finally decode the appropriate program. The information regarding which RF channel to tune to for receiving a program is found typically in program information tables that are repeatedly sent either within the same transport stream or in another adjoining packet stream sent to the CPE.

For example, in CPE implementing the OpenCable™ standard, such translation from the desired program channel to the actual tuning details can be performed using special descriptors contained within the program-specific information (PSI); including e.g., PAT or PMT. In one variant, the cross-references or mapping is defined within the PMT. In another embodiment, the correlation between the desired program and the tuning details is performed using information contained in the Event Information Tables (EITs). Other approaches may also be used with equal success.

For wideband tuning, the exemplary CPE 206 of the present invention uses a mechanism somewhat similar to the aforementioned tuning mechanism. The tuning procedure is advantageously assisted in the exemplary embodiment of FIG. 4a by imposing the requirement that all table formats are kept substantially consistent with those present in legacy systems. A given content program is indicated as a wideband program if it requires simultaneous demodulation of multiple RF carriers. In another table entry, the number of channels (M) that the program is spread over is provided. Once the CPE 206 decodes this number, it can then search for the exact QAM channel frequencies used for wideband modulation of this program, through yet another entry in a table. In one variant of this information scheme, all M channels over which the program is spread are listed. In another variant, the M channels are selected so as to be contiguous, and the table utilizes a syntax indicating a starting (or terminus) point and another field corresponding to the number of contiguous channels (e.g., "M contiguous channels starting at [starting point]", or "M contiguous channels up to and including [terminus]"). These latter approaches economize the downstream transmission of table bits.

Figure 5:
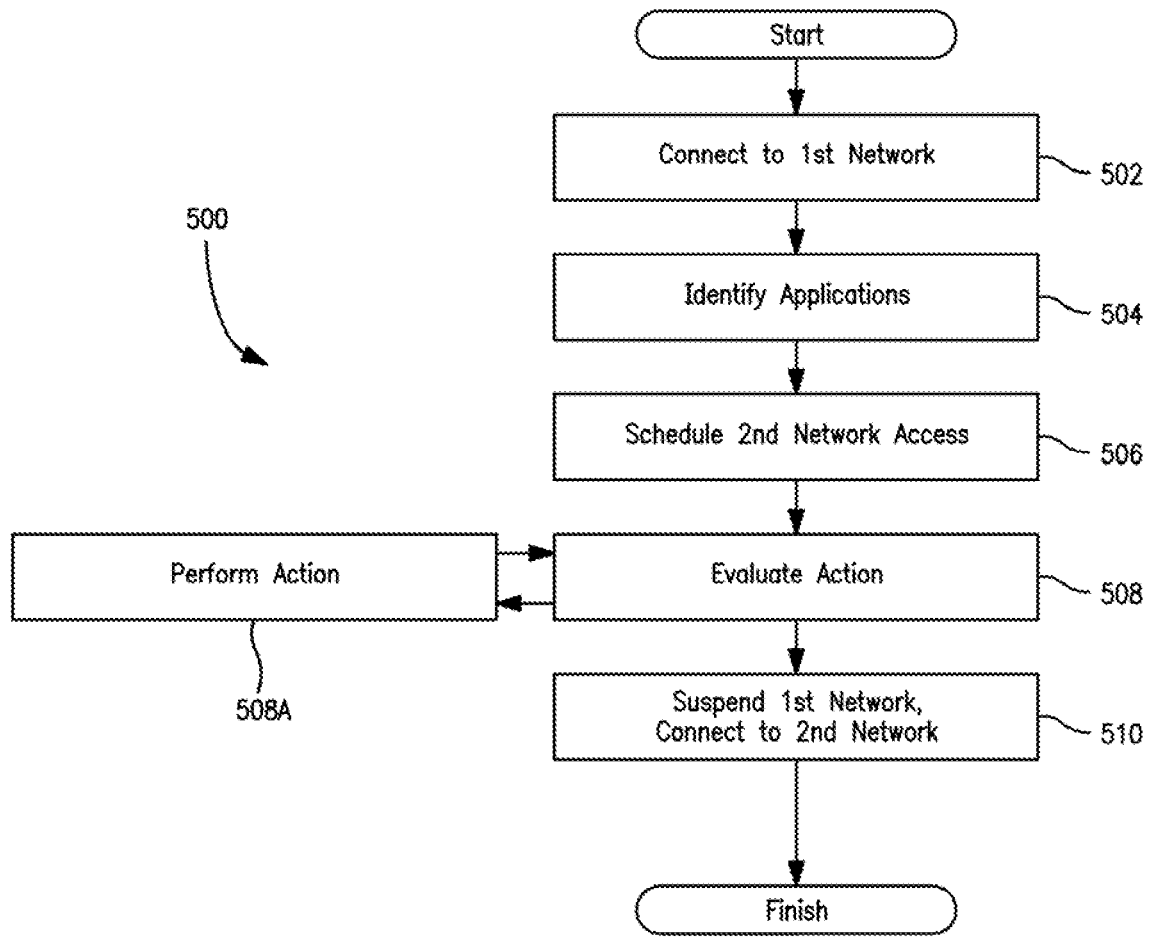
FIG. 5 is a logical flow diagram of an exemplary computer-implemented process used to perform content downloads in accordance with one embodiment of the present invention.

An exemplary embodiment of the program tuning logic according to the invention is shown in FIG. 5. When the CPE 206 is made to tune to a particular program, it first determines whether the program to which it has tuned is a wideband program (step 502). If the program is not wideband (as determined by, e.g., a table entry and/or other prescribed format as discussed above), the algorithm proceeds with conventional tuning steps (504). If the program is determined to be wideband in nature, the CPE makes sure that the wideband program is within its decoding capability (step 506). If the program cannot be decoded, then feedback is provided to the user (e.g., an "unable to decode" message displayed on the user's display device), and/or transmitting entity (such as via an upstream OOB channel) via step 508. If the program is decodable, tuning channel information for the program is extracted and parsed per step 510. Additional processing is then conducted per step 512, such additional processing comprising any number of different steps necessary to further decode and display the decoded content as is known to those of ordinary skill.

Packet Jitter, Delay and Reordering

It is possible for packets belonging to the same program or content stream to reach the CPE 206 by traveling over different physical carriers (i.e., a logical channel established over multiple physical channels, akin to ATM VPI/VCI), leading to a situation where these packets are received out-of-order or in a shuffled manner at the CPE. In one embodiment of the invention, a packet re-ordering function is implemented in the CPE 206. One variant of this reordering function comprises using a continuity counter (CC) field in the header of the bits of the MPEG header portion of the packets. This approach advantageously makes use of existing protocol structures, thereby obviating the addition of more packet overhead or other mechanisms. However, it will be appreciated that the packet reordering process of the invention is not inherently dependent on the MPEG CC field; many other transport protocols provide packet counter in header field that enable such packet reordering. Furthermore, other mechanisms for packet management can be employed along with reordering, such as use of jitter compensation (e.g., jitter buffer) described below or the like which, inter alia, sets outer bounds on the latency of late-arriving packets.

In general, the modulation parameters used for each of the M channels in a wideband multiplex may not be same. This poses the additional complication to the CPE 206 that packets may undergo unequal delay from input to the multiplexer on the head-end side to the output of the demultiplexer 424 on the CPE side. In some applications, CPE implementations will want to remove this timing jitter within a content program. Depending on variables such as the constellation used for a carrier, the end-to-end delay for packets could be different. The de-jittering operation can be performed using any number of different approaches, such as by inspecting the packets for embedded timestamps within the packets to indicate their degree of jitter (e.g., relative to a system or SI clock or other time reference). The jitter compensator 424 of the present invention may also employ analysis of the modulation characteristics of each QAM carrier within the wideband multiplex in relation to the extracted timing information to make dynamic adjustments of the jitter compensator (and/or even the relevant modulator/demodulator itself). It will be appreciated that from the broader perspective, a timing correction function at the receiving end (e.g., CPE 206) that extracts the relevant timing information and compensates for any jitters is useful in meeting real time specifications for digital audio/video programs.

Implementation in Edge_QAM

In certain applications, cable system operators may use so-called "Gigabit Ethernet" (GBE) or a similar data infrastructure and protocol for transporting audio/video content in the core network (that is, between the head-end and the network hubs). Therefore, the hubs may be used as the location where digital television signals are modulated to QAM channels. The architectural device that performs this function is commonly referred to an "Edge QAM" device. At the Edge QAM device, packets belonging to a given content program are selected from the input (e.g., Gigabit Ethernet) interface and transferred to the desired output port.

Figure 6:
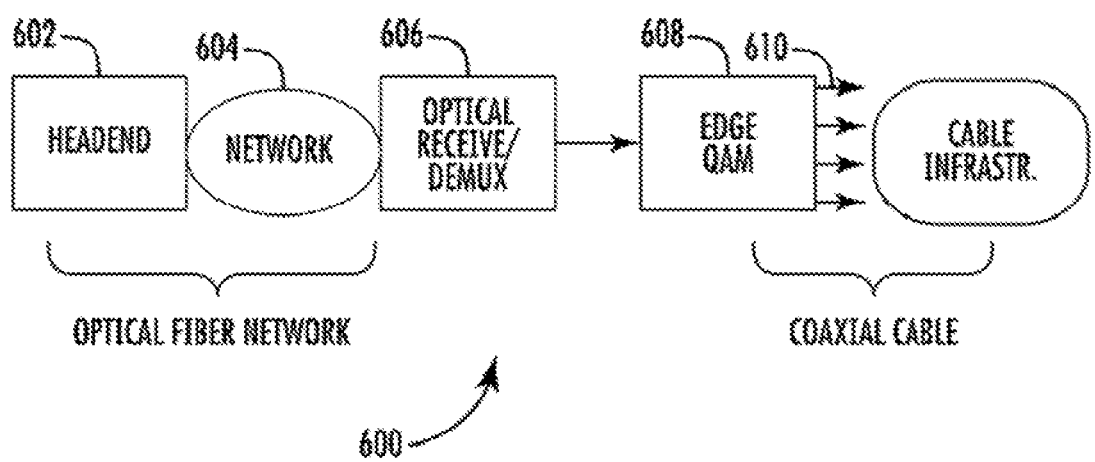
FIG. 6 is a functional block diagram of another exemplary network architecture according to the invention, wherein an optical network and Edge QAM are utilized.

Hence, in alternate embodiments of the present invention, aspects of the HD statistical multiplex implemented at the cable system head-end 200 of FIG. 2, such as QAM modulation, can be implemented at the Edge QAM, or alternatively all of the required functionality (e.g., multiplexing, modulation and encryption) can be implemented at the Edge device. FIG. 6 illustrates one exemplary embodiment of a system 600 wherein the head-end 602 is coupled via, e.g., an optical fiber network 604, to an optical receiver 606 and ultimately an Edge QAM 608. The optical network may comprise, e.g., a dense wave division multiplexing (DWDM), O/FDM, or similar approach. The optical receiver demultiplexes the optical "transport stream", and provides this data via, e.g., a GBE interface or Asynchronous Serial Interface (ASI), to the Edge QAM device 608, which modulates the signal onto the various carriers 610 of the cable (RF) portion of the network.

Figure 6A:
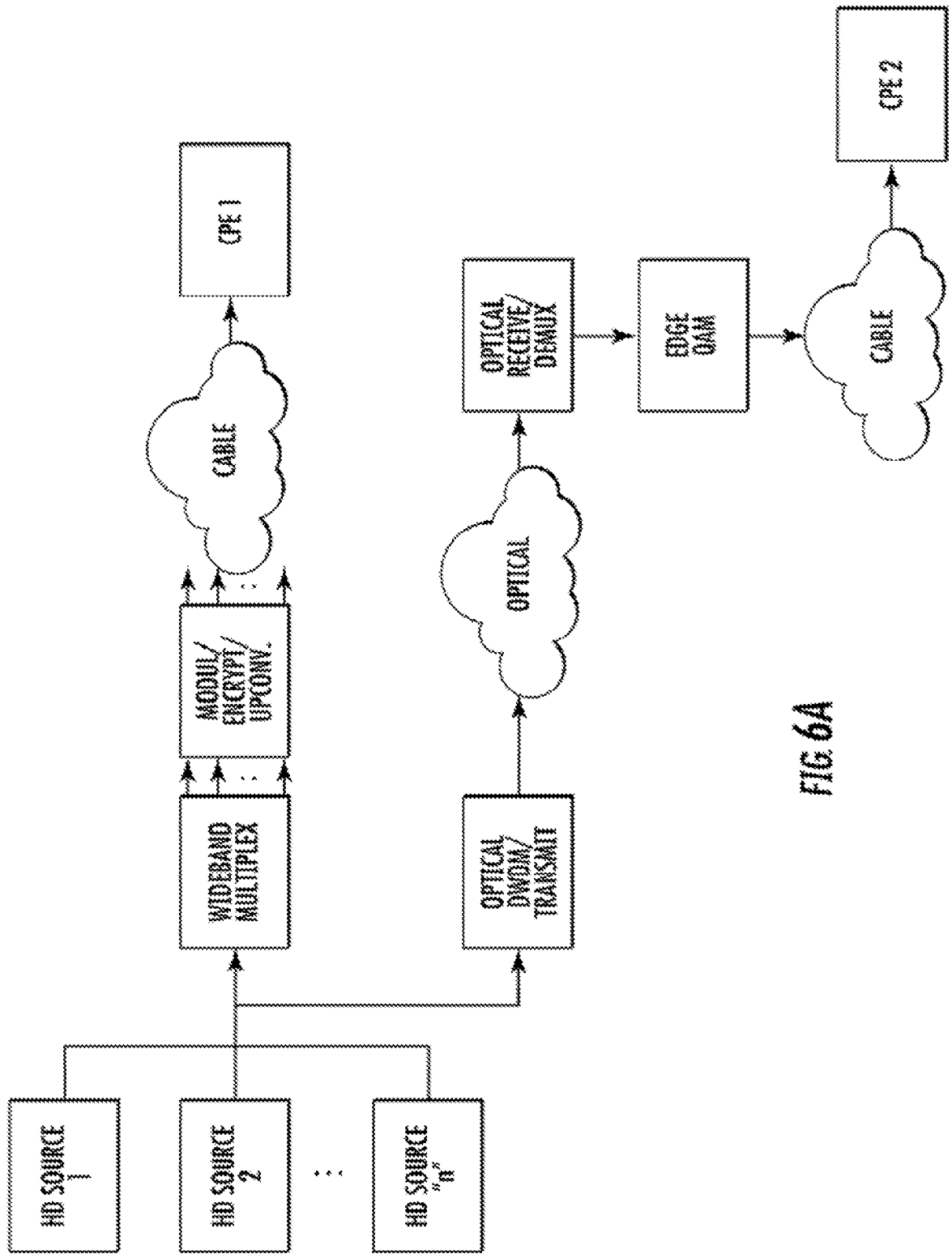
FIG. 6a is a functional block diagram of yet another exemplary network architecture according to the invention, wherein both a wideband head-end MEM and a separate optical network and Edge QAM are utilized.

It will be appreciated that literally any type of medium (or in fact multiple types of mediums in serial or parallel) can be interposed between the head-end 602 and the Edge QAM 608. Furthermore, the use of multiple homogeneous or heterogeneous edge devices is contemplated, such as for example where one configuration of Edge QAM is used at all hubs, or alternatively where a first configuration is used at one distribution hub, while another configuration is used at another hub. Furthermore, the network as a whole can by hybridized or heterogeneous, such as where portions of a given service region are served by an architecture akin to that of FIG. 2a, and others served by an architecture akin to that of FIG. 6 (see FIG. 6a).

It is further noted that the foregoing reference to GBE systems is purely illustrative; for example, asynchronous transfer mode (ATM) backbones or other types of networks/protocols may be used as the preferred medium between various of the network's architectural elements.

It can also be appreciated that the methods of the present invention may be practiced using any configuration or combination of hardware, firmware, or software, and may be disposed within one or any number of different physical or logical entities. For example, the HD wideband multiplex functionality described above may take the form of one or more computer programs running on a single device disposed within the network (e.g., the MEM 212 previously described), such as at a head-end, node, or hub. Alternatively, such computer programs may have one or more components distributed across various hardware environments at the same or different locations. As yet another example, portions of the functionality may be rendered as a dedicated or application specific IC having code running thereon. Myriad different configurations for practicing the invention will be recognized by those of ordinary skill in the network arts provided the present disclosure.

Wideband Stagger-Cast

It will be recognized that the wideband apparatus and methods of the present invention can also be used to afford other benefits, including increased HD density and near-VOD (NVOD) capability. Specifically, in one embodiment, programming is "stagger-cast" such that time-shifted copies of a given high video quality (e.g., HD) program are transmitted over the wideband multiplex. Stagger-cast is a process wherein identical copies of the same program, with their start times staggered by some duration, are multiplexed with each other to form a transport stream. When a viewer tunes to the transport stream, the viewer can start watching the program from the beginning as soon as the start of a next staggered copy of the program is received. This results in a VOD-like functionality without having to wait for a long period of time (e.g., until the next scheduled iteration of the complete movie, such as the next 2-hour slot). For example, twenty-four copies of a movie of 120 minutes duration can be staggered to start 5 minutes apart in a single cable QAM channel, with each copy being assigned approximately 1.2 Mbps bandwidth. When the viewer tunes into such a multiplex, he is never more than 5 minutes away from starting point of a copy of the program.

As noted above, each time-shifted version of the program comprises a different broadcast. Thus, the MSO can provide the user with a near-VOD capability, with the level of latency (i.e., how "near" the NVOD really is to true VOD, such as the 5 min. referenced in the above example) being determined by the metrics of the time delay and wideband multiplex.

It will be appreciated that there is a trade-off between the aforementioned latency versus and the number of copies of the same program that are multiplexed together. For example, the above exemplary stagger-cast stream could also be constructed using 12 copies of the program, staggered to start 10 minutes apart. Therefore, if a service provider wants to offer to the viewers a service that reduces the wait or latency of a given point in the program being again accessible, more copies of the programs will have to be multiplexed together.

If a stagger-cast technique is to be applied to high quality programs (such as HD programs) at the typical 12-18 Mbps compression rate, only about 3 copies can be stagger-cast together. However, when a wideband multiplex such as that of the present invention is used, there is additional bandwidth available to include more copies, thereby reducing the wait time or latency experienced by the viewer. As an example, in a wideband multiplex consisting of four QAM channels, 12 copies of an HD program of 120 minutes duration each can be stagger-cast, assuming 12 Mbps each, with the resultant wait time being less than 10 minutes.

Therefore, the use of a wideband multiplex according to the invention advantageously overcomes the limitation of offering multiplexed HD stagger-cast programming in a single multiplex, and offers a system operator the ability to provide high quality stagger-cast near-VOD services with minimal user wait time.

Use of the wideband tuner of the present invention also provides additional benefits in that it avoids the "tuning away" from a single physical channel as in the prior art (non-wideband) systems, thereby making the stagger-cast implementation more efficient. Specifically, the user can access stagger-cast copies of the program by simply accessing the wideband multiplex at a given stagger time coordinate, and hence no additional tuning to a different simulcast/stagger-cast channel is required.

Business Methods

In another aspect of the invention, the foregoing "wideband" head-end, Edge, and CPE capabilities can be used to implement various business paradigms. As previously discussed, the migration of a given service area or subset of users to newer (wideband) CPE can be performed in a controlled fashion which does not strand any users or forcibly require them to upgrade to the newer CPE or face losing service.

However, additional business models are envisaged, including for example selectively providing the upgraded or wideband CPE to a subset of users/subscribers (whether on a fee basis, as a promotion, or for free) as a "premium" feature. As previously discussed, with two or more operating modes (such as, e.g., 8 QAMs, 4 QAMs, and 2 QAMs) for the wideband receiver, and changes between the modes being essentially seamless, the subscriber is provided with enhanced reliability and continuity during periods of equipment failure, maintenance, or mode-shifting at the head-end in response to changing program conditions. For example, with a single-QAM prior art CPE, loss of that single QAM means (at least temporary) loss of the HD or other content streamed over it. In contrast, loss of a single QAM in an eight QAM wideband system reduces the QAM pool for the head-end multiplexer, in effect forcing a mode shift (e.g., to four QAMs, where the four QAMs do not include the lost QAM). This shift can be seamless, such as via a simple in-band or OOB downstream communication telling the CPE when and which mode to shift to. The head-end and CPE can also be configured with "QAM packages", or predetermined sets of particular QAMs, such that the head-end need merely transmit the QAM package number to the CPE. Alternatively, the QAM packages can be programmatically shifted-to under certain operational conditions, such as maintenance, etc.

It will also be appreciated that the user or subscriber can be provided a financial or other incentive to install the wideband CPE (as to replace their existing legacy CPE), since the greater the permeation of the wideband CPE in a given service area, the greater the benefits to the MSO or provider in terms of statistical multiplexing efficiency for HD programs. Consider, for example, the limiting case of where the wideband statistical multiplexer (MEM 212) described in FIG. 2 is in communication with an installed CPE pool comprising only legacy (non-wideband) CPE. The benefits of the wideband MEM 212 are hence totally frustrated, since the MEM can only use a single QAM to communicate with each CPE. However, at the other limit (i.e., all installed CPE are wideband CPE), the full benefits of the multiplexing approaches described herein can be realized. Hence, there is financial incentive to the MSO to get as many wideband CPE installed as possible, and one possible way to accomplish this is to pay subscribers, or offer discounts or other incentives, to make the trade.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized network apparatus configured to deliver information over a managed hybrid fiber coaxial network infrastructure to a plurality of computerized client devices comprising at least one wideband device, the computerized network apparatus comprising:
  server apparatus comprising:
    processor apparatus;
    network interface apparatus in data communication with the processor apparatus; and
    storage apparatus in data communication with the processor apparatus, the storage apparatus comprising at least one computer program configured to, when executed on the processor apparatus:
      utilize at least one statistical multiplexing algorithm to allocate at least a portion of bits of each of a plurality of packetized program streams across different ones of a plurality of radio frequency (RF) carriers, respectively, as a function of time, wherein the at least one statistical multiplexing algorithm comprises a multiple-input multiple-output multiplexing algorithm that allocates an N number of the plurality of packetized program streams across an M number of a plurality of radio frequency (RF) carriers based at least on a program-specific information data structure generated in accordance with one or more network operator-controlled rules;
      modulate the allocated at least portion of bits of each of the plurality of packetized program streams onto the different ones of the plurality of RF carriers via use of quadrature amplitude modulation (QAM) for transmission;
      insert program data relating to the program-specific information data structure into at least one of the plurality of packetized program streams; and
      subsequent to the insertion, cause transmission of the plurality of packetized program streams to the plurality of computerized client devices over the different ones of the plurality of RF carriers, respectively;
      wherein the M number of the plurality of RF carriers are selected so as to be contiguous and the program-specific information data structure indicates at least one of (i) a starting point of the contiguous M number of the plurality of RF carriers, or (ii) another data field corresponding to the contiguous M number of the plurality of RF carriers.

2. The computerized network apparatus of claim 1, wherein the different ones of the plurality of RF carriers comprise at least one quadrature amplitude modulation (QAM)-modulated channel.

3. The computerized network apparatus of claim 1, wherein:
  the computerized network apparatus further comprises a data interface configured to access an on-demand digital content source, the on-demand digital content source in communication with the managed hybrid fiber coaxial network infrastructure; and
  the plurality of packetized program streams comprise on-demand digital content.

4. The computerized network apparatus of claim 1, wherein the first data interface comprises an interface to a gigabit Ethernet network.

5. The computerized network apparatus of claim 1, wherein the computerized network apparatus further comprises a data interface configured to transmit the at least portion of bits of each of the plurality of packetized program streams to a service group over the different ones of the plurality of RF carriers, the service group comprising a plurality of users of the managed hybrid fiber coaxial network infrastructure.

6. The computerized network apparatus of claim 5, wherein the plurality of users of the service group are associated with a distribution node within the managed hybrid fiber coaxial network infrastructure, and each of the plurality of users associated with the distribution node are served by an edge device disposed at the distribution node.

7. The computerized network apparatus of claim 1, wherein the allocation further comprises a multiplex configured to utilize at least two data carousels having different data rates, the at least two data carousels configured to provide optimized placement of the at least portion of bits on said plurality of RF carriers.

8. Computer readable apparatus comprising a non-transitory storage medium, the non-transitory storage medium comprising at least one computer program having a plurality of instructions, the plurality of instructions configured to, when executed on a digital processing apparatus, cause a computerized network apparatus to:
  cause generation of a program-specific information data structure in accordance with at least one operator-controlled rule;
  multiplex a plurality of digital content streams across a plurality of individual radio frequency (RF) carriers, the multiplex comprising an assignment of at least a portion of bits of each of the plurality of streams to different ones of the plurality of RF carriers as a function of time, the assignment comprising use of at least one statistical multiplexing algorithm and the program-specific information data structure to determine a mapping of a number N of the plurality of packetized program streams to a number M of the different ones of the plurality of RF carriers; and
  modulate the assigned at least portion of bits of each of the plurality of digital program streams onto the different ones of the plurality of RF carriers;
  cause insertion of program data into at least one of the plurality of digital program streams before delivery of the plurality of digital program streams over the different ones of the plurality of RF carriers, respectively, to a plurality of computerized client devices of a managed hybrid fiber coaxial network infrastructure;
  wherein:
    the plurality of computerized client devices comprise at least one wideband-capable device; and
    the program data comprises data indicating at least one of (i) a terminus point associated with a portion of the number M of the different ones of the plurality of RF carriers which are contiguous, or (ii) a terminus point associated with a portion of the number M of the different ones of the plurality of RF carriers which are non-contiguous.

9. The computer readable apparatus of claim 8, wherein the generation of the program-specific information data structure occurs only once based on use of the at least one operator-controlled rule.

10. The computer readable apparatus of claim 8, wherein:
the multiplex comprises a multiplex algorithm controlled by the at least one operator-controlled rule; and
the at least one operator-controlled rule relates to available bandwidth of at least portions of the managed hybrid fiber coaxial network infrastructure.

11. The computer readable apparatus of claim 10, wherein the at least one operator-controlled rule causes an extraction of the at least portion of bits from one or more of the plurality of digital program streams based at least on respective times of arrival at one or more packet queues.

12. The computer readable apparatus of claim 8, wherein the assigned at least portion of bits of each of the plurality of streams are modulated onto the different ones of the plurality of RF carriers via use of quadrature amplitude modulation (QAM).

13. The computer readable apparatus of claim 8, wherein the assignment is based at least in part on a constraint algorithm, and use of the constraint algorithm is based at least in part on a failure of one or more of the plurality of RF carriers during transmission of certain ones of the plurality of bits.

14. The computer readable apparatus of claim 13, wherein the constraint algorithm causes transmission of selected ones of at least the portion of bits of each of the plurality of streams to be constrained to a subset of the different ones of the plurality of RF carriers, the transmission comprising transmission of the constrained portion of bits and non-constrained portion of bits across the plurality of RF carriers.

15. A computerized method of transmitting data over a network infrastructure to a plurality of computerized client devices, the plurality of computerized client devices comprising at least one wideband-capable device, the computerized method comprising:
utilizing at least one statistical multiplexing algorithm to allocate at least a portion of bits of each of a plurality of packetized program streams across different ones of a plurality of radio frequency (RF) carriers, respectively, as a function of time, wherein the at least one statistical multiplexing algorithm comprises a multiple-input multiple-output multiplexing algorithm that allocates an N number of the plurality of packetized program streams across an M number of a plurality of radio frequency (RF) carriers based at least on a program-specific information data structure generated in accordance with one or more network operator-controlled rules;
modulating the allocated at least portion of bits of each of the plurality of packetized program streams onto the different ones of the plurality of RF carriers via use of quadrature amplitude modulation (QAM) for transmission;
inserting program data relating to the program-specific information data structure into at least one of the plurality of packetized program streams; and
causing transmission of the plurality of packetized program streams to the plurality of computerized client devices over the different ones of the plurality of RF carriers, respectively;
wherein:
the M number of the plurality of RF carriers are selected so as to be contiguous; and
the program-specific information data structure comprises data indicating at least one of (i) a starting point of the contiguous M number of the plurality of RF carriers, or (ii) another data field corresponding to the contiguous M number of the plurality of RF carriers.

16. The computerized method of claim 15, wherein the program-specific information data structure data further comprises data indicating the different ones of the plurality of RF carriers over which the portion of bits are modulated so as to enable simultaneous demodulation of the different ones of the plurality of RF carriers by the at least one wideband-capable device.

17. The computerized method of claim 15, further comprising transmitting the at least portion of bits to a service group within the network infrastructure over the different ones of the plurality of RF carriers, respectively; and
wherein:
the network infrastructure comprises a managed hybrid fiber coaxial network infrastructure;
the plurality of computerized client devices are associated with respective users of the managed hybrid fiber coaxial network infrastructure; and
each of the users belong to the service group.

18. The computerized method of claim 15, wherein the at least portion of bits of each of the plurality of packetized program streams comprise one or more digitally rendered on-demand content elements having a broadcast-related start time associated therewith; and the computerized method further comprises:
receiving data representative of one or more requests for the one or more digitally rendered on-demand content elements from one or more of the plurality of computerized client devices, the one or more requests originating after the broadcast-related start time; and
causing creation of at least one session between an entity of the network infrastructure and for the one or more of the plurality of computerized client devices.

19. The computerized method of claim 15, wherein the program-specific information data structure data further comprises data indicating a prescribed order in which the at least portion of bits should be extracted from the different ones of the plurality of RF carriers by the at least one wideband-capable device, the prescribed order based at least on respective times of arrival at one or more packet queues.

20. The computerized method of claim 15, wherein the utilizing of the at least one statistical multiplexing algorithm to allocate the at least portion of bits of each of the plurality of packetized program streams across the different ones of a plurality of radio frequency (RF) carriers, respectively, as the function of time comprises causing at least the portion of bits of each of the plurality of packetized program streams to be constrained to a subset of an M number of outputs of the different ones of the plurality of RF carriers.

21. The computerized method of claim 20, wherein the causing of at least the portion of bits to be constrained to the subset of the M number of outputs of the different ones of the plurality of RF carriers is based at least in part on a failure of one or more of the plurality of RF carriers during the transmission of certain ones of the plurality of bits.

* * * * *